US012807505B2

(12) United States Patent
Matsumoto et al.

(10) Patent No.: US 12,807,505 B2
(45) Date of Patent: Nov. 24, 2026

(54) SILICA-ALUMINA POWDER, METHOD FOR PRODUCING SILICA-ALUMINA POWDER, FLUID CATALYTIC CRACKING CATALYST AND METHOD FOR PRODUCING SAME

(71) Applicant: JGC CATALYSTS AND CHEMICALS LTD., Kawasaki (JP)

(72) Inventors: Hiroshi Matsumoto, Kitakyushu (JP); Shunji Tsuruta, Kitakyushu (JP); Tomohiro Mitsui, Kitakyushu (JP); Yusuke Takamiya, Kitakyushu (JP); Takaki Mizuno, Kitakyushu (JP); Yuka Seto, Kitakyushu (JP); Hiroshi Yamazaki, Kitakyushu (JP)

(73) Assignee: JGC CATALYSTS AND CHEMICALS LTD., Kanagawa (JP)

( * ) Notice: Subject to any disclaimer, the term of this patent is extended or adjusted under 35 U.S.C. 154(b) by 480 days.

(21) Appl. No.: 18/282,608

(22) PCT Filed: Dec. 27, 2021

(86) PCT No.: PCT/JP2021/048492
§ 371 (c)(1),
(2) Date: Sep. 18, 2023

(87) PCT Pub. No.: WO2022/196025
PCT Pub. Date: Sep. 22, 2022

(65) Prior Publication Data

US 2024/0166526 A1 May 23, 2024

(30) Foreign Application Priority Data

Mar. 19, 2021 (JP) ................................ 2021-045904
Mar. 19, 2021 (JP) ................................ 2021-045911
(Continued)

(51) Int. Cl.
*C01B 33/18* (2006.01)
*B01J 21/12* (2006.01)
(Continued)

(52) U.S. Cl.
CPC ............ *C01B 33/181* (2013.01); *B01J 21/12* (2013.01); *B01J 37/10* (2013.01); *C01B 33/193* (2013.01)

(58) Field of Classification Search
None
See application file for complete search history.

(56) References Cited

U.S. PATENT DOCUMENTS 1,371,808 A 3/1921 Pickup, Jr.
3,245,919 A 4/1966 Gring et al.
(Continued)

FOREIGN PATENT DOCUMENTS

FR 1261182 A 5/1961
FR 1357830 A 4/1964
(Continued)

OTHER PUBLICATIONS

Crepeau et al., "Nature, Structure and Strength of the Acidic Sites of Amorphous Silica Alumina: An IR and NMR Study", J. Phys. Chem. B, 2006, 110, pp. 15172-15185.
(Continued)

*Primary Examiner* — John J Figueroa
(74) *Attorney, Agent, or Firm* — Buchanan Ingersoll & Rooney PC

(57) ABSTRACT

A silica-alumina powder, a method for producing the same, and a fluid catalytic cracking catalyst including this silica-alumina powder are provided. The silica-alumina powder contains $SiO_2$ within a predetermined range, has a specific surface area within a predetermined range, and has a pore volume and an acid amount within predetermined ranges.
(Continued)

An alumina raw material includes one of boehmite, pseudo-boehmite, and mainly amorphous alumina gel. The method for producing the silica-alumina powder includes a step of mixing an aqueous solution including alumina hydrate and an aqueous solution containing a silica precursor to prepare an aqueous solution including a silica-alumina precursor; a step of adjusting the pH of the aqueous solution to be within a predetermined range, and then heat-treating the aqueous solution; and a step of cooling the aqueous solution or silica-alumina slurry, then separating and washing a solid, and then drying or further calcining the solid.

3 Claims, 2 Drawing Sheets

(30) Foreign Application Priority Data

Apr. 1, 2021 (JP) ................................ 2021-062849
Dec. 15, 2021 (JP) ................................ 2021-203321

(51) Int. Cl.
*B01J 37/10* (2006.01)
*C01B 33/193* (2006.01)

(56) References Cited

U.S. PATENT DOCUMENTS

| | | | | |
|---|---|---|---|---|
| 3,268,295 | A | 8/1966 | Armbrust, Jr. et al. | |
| 3,582,379 | A | 6/1971 | Hackbarth et al. | |
| 3,630,670 | A | 12/1971 | Bell | |
| 3,864,461 | A | 2/1975 | Miller et al. | |
| 4,066,574 | A | 1/1978 | Tamm | |
| 4,174,301 | A * | 11/1979 | Choca | B01J 2/20 502/263 |
| 4,179,408 | A | 12/1979 | Sanchez et al. | |
| 4,226,743 | A | 10/1980 | Seese et al. | |
| 4,344,928 | A | 8/1982 | Dupin et al. | |
| 5,171,728 | A * | 12/1992 | Sakurai | B01J 21/02 502/200 |
| 6,689,333 | B1 | 2/2004 | Stamires et al. | |
| 6,713,428 | B1 | 3/2004 | Le Goff et al. | |
| 8,222,470 | B2 | 7/2012 | Coupard et al. | |
| 8,772,196 | B2 * | 7/2014 | Ackerman | B01J 23/44 502/263 |
| 2001/0008688 | A1 * | 7/2001 | Nakahara | B41M 5/5218 428/404 |
| 2008/0171811 | A1 * | 7/2008 | Guiselin | D21H 19/38 524/437 |
| 2010/0298129 | A1 * | 11/2010 | Liang | B01J 23/888 502/250 |
| 2012/0006724 | A1 * | 1/2012 | Du | B01J 23/75 502/64 |
| 2012/0122670 | A1 | 5/2012 | Polli et al. | |
| 2014/0187411 | A1 | 7/2014 | Cooper et al. | |
| 2015/0136707 | A1 | 5/2015 | Suzuki | |
| 2023/0025198 | A1 * | 1/2023 | Tang | C10G 45/08 |
| 2023/0381757 | A1 * | 11/2023 | Tian | B01J 23/75 |

FOREIGN PATENT DOCUMENTS

| | | | |
|---|---|---|---|
| FR | 1381282 | A | 12/1964 |
| GB | 1065733 | | 4/1967 |
| GB | 1603461 | | 11/1981 |
| JP | 273989 | B | 10/1952 |
| JP | 305963 | B | 8/1955 |
| JP | 311862 | B | 3/1956 |
| JP | 32413 | | 1/1957 |
| JP | 4928358 | B1 | 7/1974 |
| JP | 53119800 | A | 10/1978 |
| JP | 54160598 | A | 12/1979 |
| JP | 55116622 | A | 9/1980 |
| JP | 55162417 | A | 12/1980 |
| JP | 62191417 | A | 8/1987 |
| JP | 62230612 | A | 10/1987 |
| JP | 06127931 | A | 5/1994 |
| JP | 0871417 | A | 3/1996 |
| JP | 09255321 | A | 9/1997 |
| JP | 11157828 | A | 6/1999 |
| JP | 2003507298 | A | 2/2003 |
| JP | 2003517993 | A | 6/2003 |
| JP | 2009173935 | A | 8/2009 |
| JP | 2010537808 | A | 12/2010 |
| JP | 2013-542855 | A | 11/2013 |
| JP | 2016-000686 | A | 1/2016 |
| JP | 2016502971 | A | 2/2016 |
| JP | 2017197458 | A | 11/2017 |
| JP | 2020032350 | A | 3/2020 |
| JP | 2020032352 | A | 3/2020 |
| JP | 2021151942 | A | 9/2021 |
| WO | 0001617 | A1 | 1/2000 |
| WO | 0145838 | A1 | 6/2001 |
| WO | 2008056668 | A1 | 5/2008 |
| WO | 2013183742 | A1 | 12/2013 |

OTHER PUBLICATIONS

Emeis, CA., "Determination of Integrated Molar Extinction Coefficients for Infrared Absorption Bands of Pyridine Adsorbed on Solid Acids Catalysts", J. Catal., 141, 1993, pp. 347-354.

International Search Report and Written Opinion for International Application No. PCT/JP2021/048492, dated Feb. 22, 2022, 8 pages.

Matsunaga et al., "IR Characterization of Homogeneously Mixed Silica-Alumina Samples and Dealuminated Y Zeolites by Using Pyridine, CO, and Propene Probe Molecules", J. Phys. Chem. C, 2013, 117, pp. 14043-14050.

Ohishi, Y., "Measuring Method of Abrasion and Attrition Resistance of Catalyst", Shokubaikasei Giho, (Technical Journal of JGC Catalysts and Chemicals Ltd., vol. 13, No. 1, P65, 1996, 2 pages. Abstract only.

Office Action (Notice of Reasons for Refusal) issued Aug. 5, 2025, by the Japan Patent Office in corresponding Japanese Patent Application No. 2021-203321 and an English translation with Concise Statement of Relevance of the Office Action. (8 pages).

* cited by examiner

SILICA-ALUMINA POWDER, METHOD FOR PRODUCING SILICA-ALUMINA POWDER, FLUID CATALYTIC CRACKING CATALYST AND METHOD FOR PRODUCING SAME

CROSS REFERENCE TO RELATED APPLICATIONS

This is the U.S. National Phase application of PCT/JP2021/048492, filed Dec. 27, 2021, which claims priority to Japanese Patent Application No. 2021-045911, filed Mar. 19, 2021, Japanese Patent Application No. 2021-045904, filed Mar. 19, 2021, Japanese Patent Application No. 2021-062849, filed Apr. 1, 2021 and Japanese Patent Application No. 2021-203321, filed Dec. 15, 2021, the disclosures of each of these applications being incorporated herein by reference in their entireties for all purposes.

FIELD OF THE INVENTION

The present invention relates to a silica-alumina powder that is suitably used for various purposes and a method for producing this silica-alumina powder, and relates particularly to porous silica-alumina particles that have a large pore volume and a large specific surface area, a silica-alumina powder that is suitably used as a fluid catalytic cracking catalyst, and methods for producing these porous silica-alumina particles and silica-alumina powder. More specifically, aspects of the present invention relate to a fluid catalytic cracking catalyst that includes silica-alumina, has high decomposition performance for heavy hydrocarbon oil fractions (hereinafter also referred to simply as “bottoms”) and coke, has a low coke yield, and is excellent in gasoline yield, and to a method for producing this fluid catalytic cracking catalyst.

BACKGROUND OF THE INVENTION

Methods for preparing a silica-alumina composite are publicly known in the subject technical field, and a neutralization reaction method and a pH swing method can be named as representative methods.

One neutralization reaction method (a coprecipitation method, a co-gelation method) is a preparation method, like Patent Literatures 1 to 4, that mixes silica hydrogel and a solution of a metallic salt and can thereby produce amorphous silica-alumina with the metallic salt evenly contained therein.

One pH swing method (dipping method) is a preparation method, like Patent Literatures 5 and 6, that changes the pH of a reaction mixture so as to precipitate silica and alumina and can thereby produce amorphous silica-alumina inside a single container.

A fluid catalytic cracking catalyst used for a process of fluid catalytic cracking (FCC) of raw material oil (hydrocarbon oil), for example, residual oil of atmospheric distillation includes zeolite that is a solid acid. Further, a matrix component, for example, silica-alumina having hydrocarbon oil cracking activity is added to the fluid catalytic cracking catalyst for purposes such as imparting attrition resistance during use in a fluid state.

Generally, silica-alumina means a mixture or a composite oxide of silica and alumina. A mixture of silica and alumina means one in which silica and alumina are physically mixed without involving chemical bonding. In this case, the mixture of silica and alumina has a Lewis acid originating from alumina. On the other hand, a composite oxide of silica and alumina means one in which silica and alumina are mixed through chemical bonding. In this case, the composite oxide of silica and alumina has a Broensted acid originating from its crystal structure.

Silica-alumina has a characteristic that its acid properties vary depending on whether chemical bonding between silica and alumina is involved. From long ago, this characteristic has been taken advantage of to use silica-alumina for various catalytic reactions. Silica-alumina is produced by a variety of methods.

For example, Patent Literature 7 discloses a method for producing a partially crystalized silicoaluminate alkali by mixing raw materials including silica and alumina with an alkaline metal hydroxide and a solid reagent. This is a method in which mixing and crystallization are simultaneously performed through heating until a solid phase is obtained, and mixing is continued until redispersion occurs.

Patent Literature 8 discloses a method for producing a silica-alumina hydrogel catalyst. This is a method in which sodium silicate and acidic aluminum salt are caused to react with each other in a solution to generate silica-alumina gel.

Patent Literature 9 discloses a method for producing amorphous aluminosilicate. This is a method in which an aqueous solution of alkali metal aluminate is added to an aqueous solution of alkali metal silicate under vigorous stirring at a temperature of 15 to 100° C., followed by a heat treatment at a temperature of 70 to 100° C.

Patent Literature 10 discloses a method for producing a catalyst in an olefin oligomerization method using a silica-alumina catalyst. This method for producing a catalyst uses a method including a step of mixing at least one alumina compound that is partially soluble in an acidic medium with at least one silica compound that is completely soluble in a reaction mixture or with a combination of at least one silica compound and at least one alumina compound, both completely soluble in a reaction mixture, to thereby form a solid precursor of the catalyst, and a step of calcining the solid obtained by the preceding step in moist air for four to seven hours and performing a hydrothermal treatment.

Patent Literature 11 discloses aluminum silicate having a high cesium ion adsorption capacity and a method for producing the same. This aluminum silicate is represented by the following Formula (I): $xNa_2O \cdot Al_2O_3 \cdot mSiO_2 \cdot nH_2O$ . . . (I) (where x meets $0.12 \leq x \leq 1.3$; m meets $5.0 \leq m \leq 15.0$; and n meets $5 \leq n \leq 15$), and contains $Na_2O$ at a ratio of 1.5 to 11.0 weight %, with 50% or more of aluminum atoms being aluminum atoms with a coordination number of four.

Patent Literature 12 discloses a method for producing an alkaline metal aluminosilicate composite. This is a method in which a predetermined amount of sodium sulfate is supplied during a period in which sodium silicate and aluminum sulfate are made to react with each other in an aqueous medium.

For example, Patent Literature 13 discloses silica-alumina having a structure in which a silica layer is formed on a surface of alumina as a nucleus, a method for producing the same, and a catalyst for hydrotreatment.

Patent Literature 14 discloses a catalyst composite for fluid catalytic cracking of heavy oil containing, as a catalytic component, silica-alumina having a structure in which silica is attached and bonded to a surface of alumina serving as a nucleus.

Patent Literature 15 discloses a silica-alumina composite oxide having a structure in which a silica layer is formed on a surface of an alumina particle as a nucleus, and a method for producing the same.

Patent Literature 16 discloses amorphous silica-alumina for which a silica content, a specific surface area, and an acid amount are specified, and a method for producing the same.

Patent Literature 17 discloses a method in which an inexpensive pseudo-crystalline boehmite precursor and an additive are brought together and aged to thereby produce pseudo-crystalline boehmite including the additive in an evenly dispersed state.

Patent Literature 18 discloses porous composite particles composed of an aluminum oxide component, for example, crystalline boehmite having an average crystallite size of about 20 to about 200 angstroms, an additive component residue, for example, silicate or phosphate, of a crystal size growth inhibitor that is densely dispersed in this aluminum oxide component, and others.

Non Patent Literatures 1 and 2 ascertain Lewis acidic properties of silica-alumina by CO adsorption FT-IR.

PATENT LITERATURE

Patent Literature 1: Japanese Patent Publication No. 27-3989

Patent Literature 2: Japanese Patent Publication No. 31-1862

Patent Literature 3: Japanese Patent Publication No. 30-5963

Patent Literature 4: Japanese Patent Publication No. 32-413

Patent Literature 5: Japanese Translation of PCT International Application Publication No. 2010-537808

Patent Literature 6: Japanese Translation of PCT International Application Publication No. 2016-502971

Patent Literature 7: Japanese Patent Laid-Open No. 54-160598

Patent Literature 8: Japanese Patent Laid-Open No. 55-162417

Patent Literature 9: Japanese Patent Laid-Open No. 62-191417

Patent Literature 10: Japanese Patent Laid-Open No. 2009-173935

Patent Literature 11: International Publication No. WO 2013/183742

Patent Literature 12: Japanese Patent Laid-Open No. 49-28358

Patent Literature 13: Japanese Patent Laid-Open No. 06-127931

Patent Literature 14: Japanese Patent Laid-Open No. 08-071417

Patent Literature 15: Japanese Patent Laid-Open No. 09-255321

Patent Literature 16: Japanese Patent Laid-Open No. 11-157828

Patent Literature 17: Japanese Translation of PCT International Application Publication No. 2003-507298

Patent Literature 18: Japanese Translation of PCT International Application Publication No. 2003-517993

Non Patent Literature

Non Patent Literature 1: Nature, Structure and Strength of the Acidic Sites of Amorphous Silica Alumina: An IR and NMR Study, J. Phys. Chem. B 2006, 110, pp15172-15185.

Non Patent Literature 2: IR Characterization of Homogeneously Mixed Silica-Alumina Samples and Dealuminated Y Zeolites by Using Pyridine, CO, and Propene Probe Molecules, J. Phys. Chem. C 2013, 117, pp14043-14050.

Non Patent Literature 3: C. A. Emeis, J. Catal., 141, 1993, 347-354.

Non Patent Literature 4: Shokubaikasei Giho (Technical Journal of JGC Catalysts and Chemicals Ltd.(in Japanese)), Vol. 13, No. 1, P65, 1996.

SUMMARY OF THE INVENTION

However, there is a problem with the conventional technologies in that the specific surface area of the porous silica-alumina obtained by each of the preparation methods described in Patent Literatures 1 to 6 tends to be relatively small, i.e., far smaller than 400 $m^2/g$, which may lead to low particle strength.

Another problem is that the pore volume tends to be smaller than 1.0 ml/g.

Having a solid acid, silica-alumina is used for various catalytic reactions as a fluid catalytic cracking catalyst, a hydrocracking catalyst, etc.

In fluid catalytic cracking, a catalyst more capable of decomposing bottom fractions is desired. However, decomposition performance for bottom fractions is not mentioned in connection with the technologies disclosed in Patent Literatures 7 to 12 described above.

Further, in fluid catalytic cracking, a catalyst that generates a smaller amount of coke is desired, and silica-alumina is required to have thermal stability as well as moderate acid density and acid strength. However, for the technologies disclosed in Patent Literatures 13 to 18 described above, the crystallite diameter of boehmite as an alumina raw material before a silica source is added in producing silica-alumina is not specified, so that the thermal stability and the Lewis acidic properties of the silica-alumina cannot be controlled.

Non Patent Literatures 1 and 2 ascertain the properties of silica-alumina relating to a Lewis acid. However, it is only for silica-alumina containing $SiO_2$ at a ratio of 30 mass % or higher that these literatures ascertain a peak near 2230 $cm^{-1}$ indicating the presence of a Lewis acid with high acid strength. Silica-alumina undergoes an increase in specific surface area and a decrease in acid amount as the ratio of silica increases. Therefore, when used as a fluid catalytic cracking catalyst, silica-alumina containing $SiO_2$ at a ratio of 20 mass % or higher cannot secure sufficient acid density.

Aspects of the present invention aim to provide a silica-alumina powder that is suitably used for various purposes and a method for producing the silica-alumina powder. They aim to further provide a fluid catalytic cracking catalyst including the silica-alumina powder and a method for producing the same.

A silica-alumina powder provided in accordance with aspects of the present invention has the following characteristics:

that $SiO_2$ is contained within a range of 2 to 70 mass %;

that the specific surface area measured by a BET method is within a range of 90 to 600 $m^2/g$;

that one or both of the pore volume and the acid amount are within a predetermined range; and that the alumina raw material is one selected from boehmite, pseudo-boehmite, and mainly amorphous alumina gel, or is a mixture of some of these materials.

A method for producing a silica-alumina powder in accordance with aspects of the present invention is a method for producing the above-described silica-alumina powder, characterized in that the method includes:

(A) a step of mixing an aqueous solution including alumina hydrate and an aqueous solution containing a silica precursor or a silica powder to prepare an aqueous solution A including a silica-alumina precursor;

(B) a step of adjusting the pH of the aqueous solution A including the silica-alumina precursor obtained in step (A) to be within a range of 7.0 to 11.0, and then heat-treating the aqueous solution A at a temperature within a range of 40 to 180° C. for a time within a range of ten minutes to 48 hours; and (C) a step of cooling the aqueous solution heat-treated in step (B) or silica-alumina slurry obtained by the heat treatment, then separating and washing a solid, and then drying or further calcining the solid to obtain a silica-alumina powder.

A fluid catalytic cracking catalyst according to aspects of the present invention is a fluid catalytic cracking catalyst including the above-described silica-alumina powder.

A method for producing a fluid catalytic cracking catalyst according to aspects of the present invention is characterized in that the method includes:

(1) a step of mixing the above-described silica-alumina powder component, a binder component, a clay component (a bulking agent), a zeolite component, and an additive agent to obtain mixed slurry;

(2) a step of spray-drying the mixed slurry obtained in step (1) to obtain dry particles; and (3) a step of washing and drying the dry particles obtained in step (2) to obtain a fluid catalytic cracking catalyst.

Further, it is preferable that the method include, in place of step (3):

(4) a step of washing the dry particles obtained in step (2) and then further performing rare-earth metal exchange to obtain a rare-earth-metal-exchanged fluid catalytic cracking catalyst.

The silica-alumina powder and the method for producing the same according to aspects of the present invention can provide a silica-alumina powder having heat insulating properties and including a moderate solid acid. This silica-alumina powder can be used as a catalyst for petroleum refining or an optical material, or can be applied as an additive agent (intended for optical scattering, adjustment of a refractive index, etc.) of a cosmetic product, a resin filler, or a surface coating material, which makes it industrially useful.

The silica-alumina powder as porous silica-alumina particles may be such that: a mass ratio of silica to alumina is within a range of 2/98 to 70/30; the specific surface area measured by the BET method is within a range of 400 to 600 $m^2/g$; the pore volume measured by a BJH method is within a range of 1.0 to 2.0 ml/g; and the average pore diameter measured by the BJH method is within a range of 6 to 30 nm. Then, amorphous porous silica-alumina particles having a large specific surface area and a large pore volume and further enhanced in particle strength can be obtained, and these particles can be suitably used for various purposes.

In a method for producing such porous silica-alumina particles, it is preferable that: in step (A), the alumina hydrate be pseudo-boehmite alumina hydrate, and an aqueous solution of a silica powder be used; and in step (B), the pH be within a range of 7.0 to 9.0, and the heat treatment be performed at a temperature within a range of 40 to 95° C. for a time within a range of ten minutes to ten hours. Further, it is preferable that the silica powder used in step (A) contain $Na_2O$ at a ratio of 0.4 mass % or lower and sulfate ions at a ratio of 0.5 mass % or lower.

Further, the silica-alumina powder may be such that: $SiO_2$ is contained within a range of 5 to 30 mass %; the specific surface area measured by the BET method is within a range of 350 to 550 $m^2/g$; the pore volume measured using a nitrogen adsorption isotherm is within a range of 0.70 to 1.20 ml/g; in an acidity measured by IR monitoring of thermal desorption of pyridine, the silica-alumina powder has a Broensted acid, with an amount of Lewis acid being within a range of 200 to 400 μmol/g; and, in addition, the amount of ammonia desorption as an acid amount calculated from an $NH_3$-TPD measurement is within a range of 500 to 700 μmol/g, and the ratio of an acid amount at a desorption temperature of 400 to 500° C. is 10% or higher relative to a total acid amount. Such a silica-alumina powder is preferable as it can deliver enhanced decomposition performance for bottom fractions and coke when used as a fluid catalytic cracking catalyst.

In a method for producing such a silica-alumina powder, it is preferable that in step (B), the pH be within a range of 9.0 to 11.0 and that the heat treatment be performed at a temperature within a range of 80 to 100° C. for a time within a range of 0.5 to 12 hours.

Further, the silica-alumina powder may be such that: $SiO_2$ is contained within a range of 8 to 20 mass %; the specific surface area measured by the BET method is within a range of 90 to 230 $m^2/g$; the crystallite diameter in a boehmite alumina (020) plane obtained by X-ray diffraction is 10 to 50 nm; the acid density that is an amount of acid per surface area is within a range of 0.75 to 1.00 $μmol/m^2$; in a TG-DTA measurement (a thermogravimetry-differential thermal analysis measurement), the temperature of crystal transformation from boehmite alumina to gamma alumina is 470° C. or higher; and in a CO adsorption FT-IR measurement (a measurement by a Fourier transform infrared spectrophotometer), a Lewis acid exhibiting a peak near 2230 $cm^{-1}$ is present. Then, a silica-alumina powder excellent in thermal stability and having moderate acid density and high Lewis acid strength can be obtained. This silica-alumina powder is preferable as it exhibits a low coke yield and an excellent gasoline yield when used as a fluid catalytic cracking catalyst.

In a method for producing such a silica-alumina powder, it is preferable that: as the alumina raw material used in step (A), a material of which the crystallite diameter in a boehmite alumina (020) plane obtained by X-ray diffraction is 10 to 50 nm be used; the mass ratio of silica to alumina be adjusted to be within a range of 8/92 to 20/80; and in step (B), the pH be within a range of 8.0 to 11.0, and the heat treatment be performed at a temperature within a range of 70 to 100° C. for a time within a range of two to 48 hours.

DETAILED DESCRIPTION OF EMBODIMENTS OF THE INVENTION

Figure 1:
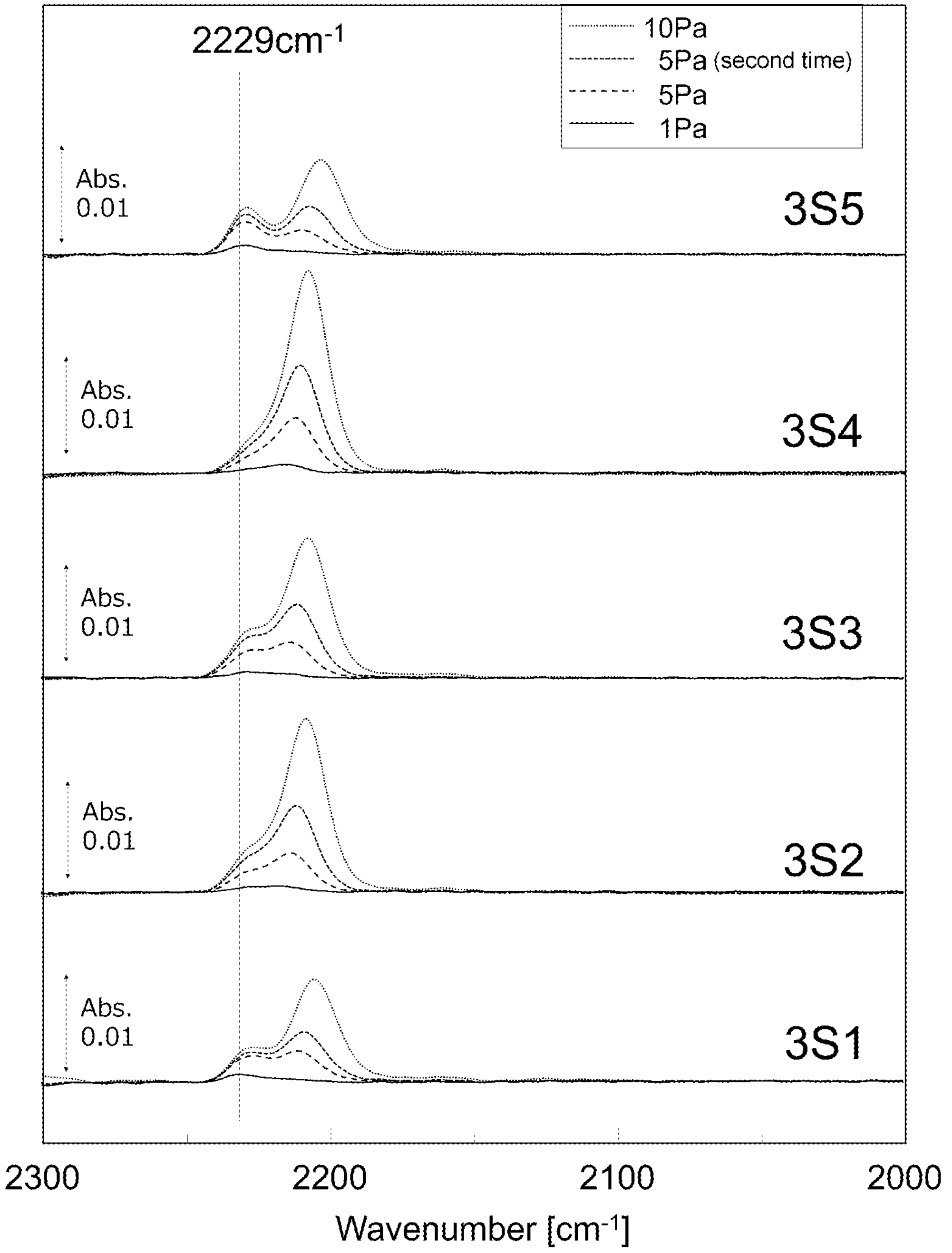
FIG. 1 is a graph obtained by a CO adsorption FT-IR measurement of silica-alumina powders 3S1 to 3S5.

Preferred embodiments of the present invention will be described in detail below.

[Silica-Alumina Powder]

A silica-alumina powder (hereinafter also referred to simply as "silica-alumina") according to aspects of the present invention has the following characteristics:

that $SiO_2$ is contained within a range of 2 to 70 mass %;

that the specific surface area measured by the BET method is within a range of 90 to 600 $m^2/g$;

that one or both of the pore volume and the acid amount are within a predetermined range; and that the alumina raw material is one selected from boehmite, pseudo-boehmite, and mainly amorphous alumina gel, or is a mixture of some of these materials.

The silica-alumina powder according to aspects of the present invention is amorphous. Therefore, zeolite or the like that is crystalline silica-alumina is not included in the silica-alumina according to aspects of the present invention. Whether the silica-alumina powder according to aspects of the present invention is amorphous can be determined from an X-ray diffraction pattern. Specifically, the silica-alumina according to aspects of the present invention can be determined to be amorphous if an X-ray diffraction pattern obtained by performing an X-ray diffraction measurement of the silica-alumina powder according to aspects of the present invention does not indicate a diffraction peak of which the full width at half maximum is smaller than 1.0° within a range of $5° \leq 2\theta \leq 50°$.

<Silica Content>

The silica-alumina powder according to aspects of the present invention contains a silica ($SiO_2$) component within a range of 2 to 70 mass %. When the content is lower than this lower limit, the silica ($SiO_2$) component is so little that the specific surface area and the acid amount decrease and predetermined performance may fail to be satisfied. On the other hand, when the content exceeds this upper limit, the alumina component is so little that the solid acid amount decreases, and the silica-alumina powder may fail to deliver predetermined decomposition performance when used as, for example, a decomposition catalyst.

<Chemical Composition (Al, Si, Na, S)>

Among the components of the silica-alumina powder according to aspects of the present invention, the chemical compositions of Al, Si, and Na were measured by an inductively coupled plasma (ICP) method and that of sulfur (S) was measured by a combustion method.

For example, 3 g of a measurement specimen was put into a lidded zirconia ball with a 30 ml capacity, heat-treated (200° C., 20 minutes) and calcined (700° C., five minutes), and then melted for 15 minutes with 2 g of $Na_2O_2$ and 1 g of NaOH added thereto. Further, the resulting product was dissolved with 25 ml of $H_2SO_4$ and 200 ml of water added thereto, and then was diluted to 500 ml with pure water to produce a specimen. The content of each component of the obtained specimen was measured based on the mass in terms of oxide using an inductively coupled plasma (ICP) emission spectrometry device (ICPS-8100, analysis software ICPS-8000, manufactured by SHIMADZU CORPORATION).

<BET Specific Surface Area Measurement>

The $N_2$ adsorption and desorption amounts of a silica-alumina powder specimen having undergone one- or two-hour pre-treatment at 500° C. in an inert gas atmosphere were measured using MacSorb-1220 manufactured by Mountech Co., Ltd. and Multisorb 12 manufactured by Yuasa Ionics Co., Ltd. From the obtained $N_2$ desorption amount, the specific surface area was calculated based on the BET one-point method. The specific surface area of the silica-alumina according to aspects of the present invention should be 90 to 600 $m^2/g$. When the area is smaller than this lower limit, the reaction interface area becomes so small that the silica-alumina may fail to deliver predetermined performance when used as a decomposition catalyst etc. On the other hand, when the area exceeds this upper limit, the pore diameter becomes too small for a reactant to diffuse into the pore, so that predetermined performance may fail to be delivered.

<Pore Distribution Measurement>

A measurement of $N_2$ adsorption by silica-alumina powder specimen having undergone one- or two-hour pretreatment at 500° C. in an inert gas atmosphere was performed using BELSORP-mini II manufactured by MicrotracBEL Corp. From the obtained $N_2$ adsorption isotherm, the pore volume and the average pore diameter of the silica-alumina were calculated using the BJH method. That the pore volume is within a predetermined range is preferable in securing both reactivity and particle strength when using the silica-alumina powder according to aspects of the present invention as a decomposition catalyst etc.

<Measurement of Acid Amount>

The acid amount of the silica-alumina powder was measured by a pyridine adsorption FT-IR measurement and an ammonia temperature-programmed desorption method ($NH_3$-TPD method). Having a moderate acid amount is preferable in controlling the decomposition reaction of hydrocarbon etc. when using the silica-alumina powder as a decomposition catalyst.

In the pyridine adsorption FT-IR measurement, 30 mg of the silica-alumina powder was molded into a disc measuring with a diameter of 20 mm, then installed in an IR cell connected to a vacuum line, and subjected to a vacuum evacuation treatment at 500° C. for one hour. After pretreatment, the temperature was lowered to 150° C., and the IR spectra of the disc specimen before and after introduction of pyridine vapor were measured with FT/IR-4600 manufactured by JASCO Corporation. Quantitative determination of Broensted acid sites and Lewis acid sites was performed based on the method described in Non Patent Literature 3.

In the measurement by the $NH_3$-TPD method, using BELCAT-B (R) manufactured by MicrotracBEL Corp., 0.2 g of a specimen was put in a measurement cell and an evacuation treatment was performed at 500° C. for one hour. Then, the temperature was lowered to 100° C., and an ammonia gas was introduced and adsorbed at 100° C. for 0.5 hours. Subsequently, an evacuation treatment was performed again at 100° C. for 0.5 hours, and then the amount of ammonia that was desorbed as the temperature rose was measured while an He gas was circulated at a rate of 50 ml per minute and the temperature was raised from 100° C. to 500° C. at a rate of 10° C. per minute.

A strong acid ratio is defined as the ratio of an acid amount at 400 to 500° C. relative to an acid amount in the entire region (100 to 500° C.):

$$\text{Strong acid ratio (\%)} = \text{acid amount (400 to 500° C.)} / \text{acid amount (100 to 500° C.)} \times 100$$

<Attrition Test Method>

The attrition resistance was measured based on a CCIC attrition index (CAI) measured by the method described in Non Patent Literature 4.

<Bulk Density (ABD) Measurement Method>

The bulk density (ABD) can be measured using a 25 ml cylinder by measuring the weight of a specimen and calculating the bulk density from the weight per unit volume.

<Average Particle Diameter>

The particle size distribution of the particles was measured with a laser diffraction and scattering-type particle size distribution measurement device (LA-300) manufactured by HORIBA, Ltd. Specifically, a specimen was fed into a solvent (water) such that light transmittance fell within a range of 70 to 95%, and the measurement was performed under the conditions of the circulation speed being 2.8 L/min., the time of ultrasonic irradiation being three minutes, and the number of times of repetition being 30 times. From the obtained particle size distribution, a median diameter (D50) was used as the average particle diameter.

<LOI. Ignition Loss or Loss of Ignition (Hereinafter Also Referred to Simply as "LOI")>

Particles as a measurement specimen were calcined at 1000° C. for one hour and the LOI was calculated as a percentage from the amount of mass reduced by calcining.

As will be described later, it is necessary to use alumina hydrate as the raw material of the silica-alumina powder, and the raw material need be one selected from boehmite, pseudo-boehmite, and mainly amorphous alumina gel or be a mixture of some of these materials.

[Method for Producing Silica-Alumina Powder]

The method for producing the silica-alumina powder includes:

(A) a step of mixing an aqueous solution including alumina hydrate and an aqueous solution containing a silica precursor or a silica powder to prepare an aqueous solution A including a silica-alumina precursor;

(B) a step of adjusting the pH of the aqueous solution A including the silica-alumina precursor obtained in step (A) to be within a range of 7.0 to 11.0, and then heat-treating the aqueous solution A at a temperature within a range of 40 to 180° C. for a time within a range of ten minutes to 48 hours; and (C) a step of cooling the aqueous solution heat-treated in step (B) or silica-alumina slurry obtained by the heat treatment, then separating and washing a solid, and then drying or further calcining the solid to obtain a silica-alumina powder.

<Raw Material of Alumina>

As alumina hydrate $Al_2O_3{\cdot}nH_2O$, boehmite, pseudo-boehmite, and amorphous or basically amorphous alumina gel are used. Any mixture of these materials can also be used. Typically, boehmite is described as alumina hydrate (AlOOH) with a formula $Al_2O_3{\cdot}nH_2O$, which encompasses a variety of materials different from one another in the degree of hydration and the structure. While differences among such materials are unclear, when n exceeds 2, the material is gel-like boehmite that is hydrated to a maximum extent. When n is 1 to 2, the material is pseudo-boehmite or microcrystalline boehmite, with crystalline boehmite coming next. Finally, when n is close to 1, boehmite crystallizes into a large crystal. The form of alumina hydrate varies greatly between the two forms of an acicular form and a prismatic form. Between these two forms, a series of various forms, such as a combination of chain, boat, and plate forms may be used. Preparation and/or molding of a solid having transition alumina obtained from alumina hydrate as a base material is described in many patents (e.g., Japanese Patent Laid-Open No. 46-7164, U.S. Pat. No. 3,864,461, Japanese Patent Laid-Open No. 53-119800, and Japanese Patent Laid-Open No. 62-230612).

<Method for Preparing Alumina Hydrate>

Comparatively pure alumina hydrate may be used in the form of powder. This powder may be amorphous or may be crystalline, and the crystalline powder may include an amorphous part. Further, alumina hydrate may be added in the form of an aqueous suspension or a dispersion liquid. An aqueous suspension or dispersion of alumina hydrate used for preparing the silica-alumina powder in the method according to aspects of the present invention may be one that can be gelated or solidified. As is well known to those skilled in the art, an acidic aqueous dispersion or suspension may be prepared by deflocculating alumina hydrate in water or an aqueous solution of alumina hydrate.

The aqueous dispersion or suspension of alumina to be used may be an aqueous suspension or dispersion of boehmite composed of fine or ultrafine colloidal particles. In particular, fine or ultrafine boehmite used in accordance with aspects of the present invention may be one obtained in accordance with French Patent No. 1261182, French Patent No. 1381282, or Japanese Patent Laid-Open No. 55-116622. An aqueous suspension or dispersion obtained from pseudo-boehmite, amorphous alumina gel, aluminum hydroxide gel, or crystalline alumina hydrogel can also be used.

Alumina hydrate may also be obtained from a wide range of commercially available alumina sources (PURAL (R), CATAPAL (R), DISPERAL (R), and DISPAL (R) commercially supplied from SASOL, HIQ (R) commercially supplied from ALCOA, etc.). Alternatively, alumina hydrate may be obtained by partial dehydration or precipitation of alumina trihydrate by a conventional method using a method commonly known to those skilled in the art. When alumina is in a gel form, it is deflocculated with water or an acidic aqueous solution. In the case of precipitation, for example, at least one of aluminum chloride, aluminum sulfate, and aluminum nitrate may be used as an acid source. A basic aluminum source may be selected from basic aluminum salts such as sodium aluminate and potassium aluminate. Examples of usable precipitants include sodium hydroxide, sodium carbonate, potassium hydroxide, and ammonia. The precipitant should be selected such that both of the aforementioned alumina supply source and that precipitant are precipitated. Depending on the acidity or the basicity of the raw-material aluminum compound, alumina hydrate is precipitated using a base or an acid (hydrochloric acid, sulfuric acid, sodium hydroxide, etc.) or a basic or acidic aluminum compound as mentioned above. These two reagents may be aluminum sulfate and sodium aluminate. Preparation of aluminum alpha hydrate using aluminum sulfate and sodium aluminate is described, for example, in Japanese Patent Laid-Open No. 53-119800. Pseudo-boehmite may be prepared by making an alkali aluminate solution react with a mineral acid solution using the method described in Japanese Patent Laid-Open No. 46-007164. Or it may be prepared as described in French Patent No. 1357830. The amorphous alumina gel may be prepared using the method described in Alcoa Paper, 1972, 19, 9, and particularly, it may be prepared by a reaction of aluminate or aluminum salt, hydrolysis of aluminum alcoholate, or hydrolysis of basic aluminum salt. The aluminum hydroxide gel may be one prepared by mixing an acidic aluminum source and a base, or a basic aluminum source and an acid, and precipitating alumina hydrate using the method described in U.S. Pat. Nos. 3,268,295, 3,245,919, or International Publication No. WO 00/01617. This mixing process is performed without back mixing. Ultrafine hydragillite may be prepared by turning alumina into cake-like gel at a temperature of an ambient temperature to 60° C. using particularly the method described in U.S. Pat. No. 1,371,808.

<Supply Source of Silica Compound>

In a form of implementation of step (A) of the method for preparing the silica-alumina powder according to aspects of the present invention, an aqueous solution containing a silica precursor or a silica powder is mixed into the alumina compound. It is preferable that the supply source of the silica compound to be added to the alumina hydrate be selected from the group consisting of silicic acid, a silicic colloidal solution, water-soluble silicate, cationic silicon salt (hydrated sodium metasilicate etc.), LUDOX ((R), ammonia type or alkali type), and quaternary ammonium silicate. Preparation of a silicic colloidal solution may be performed using a method commonly known to those skilled in the art. As the supply source of this completely soluble silicon compound, an orthosilicic acid solution ($H_2SiO_4$, $H_2O$) prepared by performing ion exchange of water-soluble alkaline silicate on resin may be used.

Methods for preparing a silica powder are widely known. Among such methods, the pH during preparation can be controlled by adjusting the supply speed of a silicate solution and an acid, and the $SiO_2$ concentration can be controlled by using a silicate solution and an acid of specified concentrations that are calculated in advance.

Any one of sodium silicate No. 1, No. 2, No. 3, potassium silicate, and other soluble silicate salts and diatomite can be used as silicate salt. The acid may be an inorganic acid, such as sulfuric acid, nitric acid, hydrochloric acid, or phosphoric acid, or an organic acid such as formic acid, but an inorganic acid is preferable.

<Step (A)>

A step of mixing an aqueous solution including alumina hydrate and an aqueous solution containing a silica precursor or a silica powder to prepare an aqueous solution A including a silica-alumina precursor Combining an alumina compound and a completely soluble silica compound, or combining a partially soluble silica compound and an alumina compound corresponds to making an alumina chemical species and a silica chemical species having a specific size and chemical reactivity contact each other in the mixture of step (A) and controlling the interaction between these chemical species. Thus controlling the interaction contributes to enhancing the homogeneity of the silica-alumina powder according to aspects of the present invention. In this preparation method, in any step before the heat treatment, the interaction activity between the silica chemical species and the alumina chemical species may be controlled according to the chemical properties of the alumina compound and the silica compound used in preparation of the silica-alumina powder. In one non-limiting example, a partially soluble alumina compound $Al_2O_3 \cdot nH_2O$ (boehmite) of hydrated aluminum type may be mixed with a completely soluble silica compound of decationized orthosilicic acid type in an aqueous medium in a state where various synthesis conditions (pH, temperature, etc.) are controlled. Or during a molding step, a partially soluble alumina compound $Al_2O_3 \cdot nH_2O$ (boehmite) of alumina hydrate type may be mixed with a commercially available completely soluble silica (LUDOX (R)) colloidal solution after machining. Following mixing in step (A) of the method for preparing silica-alumina powder, a heat treatment is performed in the presence of water (a gas phase or a liquid phase). Finally, homogeneity is achieved between the alumina chemical species and the silica chemical species at a micrometer level (or nanometer level) as required to obtain acidity and texture characteristics of the silica-alumina powder used for fluid catalytic cracking according to aspects of the present invention.

It is preferable that preparation in step (A) be performed with the temperature of the aqueous solution within 10 to 60° C. Preparation at a temperature falling excessively outside this range is not preferable, because a homogeneous reaction between silica and alumina does not occur and the silica-alumina does not exhibit high thermal stability, moderate acidic density, and high Lewis acid strength.

At a stage before a compound including part or all of silicon is added, this applies to all of a hydrated alumina powder, a spray-dried hydrated alumina powder, a dispersion and a suspension of hydrated alumina, and combinations thereof.

To increase the diameter of the mesopores of the silica-alumina powder that is finally obtained, as disclosed in U.S. Pat. No. 4,066,574, it is particularly effective to obtain the mixture of step (A) by preparing an aqueous suspension or dispersion of an alumina component (an alumina compound partially soluble in an acidic medium) such as alumina hydrate, and subsequently neutralize this mixture with a basic solution (ammonia etc.), and finally add this mixture to a completely soluble silica compound (decationized orthosilicic solution etc.) simultaneously or successively. This suspension is vigorously stirred to mechanically homogenize it, and adjustment of dry contents and re-homogenization are performed through filtration as needed, and then the resulting product is heat-treated and molded as needed at the same time or successively.

Hereinafter, in the description of the above method, first "homogenization" of the mixture is often performed by a mechanical process. For example, in the case where a product containing solid fractions is used in a state of a liquid such as a suspension, or a powder, or a filtered and precipitated state, this product is vigorously stirred so as to disperse. Mechanical homogenization of a dispersion liquid is widely known among those skilled in the art. Homogenization may be performed by a mechanical method commonly known to those skilled in the art, using, for example, a batch reactor, a continuous mixer, or a mill. The materials may be mixed inside a plug flow reactor, particularly a static reactor. A Lightnin reactor can also be used. A colloid mill such as Ultraturrax (R) turbine, Staro (R) turbine, or Staro (R) colloid mill may also be used. Commercially available IKA (R) colloid mill may also be used.

<Step (B)>

A step of adjusting the pH of the aqueous solution A including the silica-alumina precursor obtained in step (A) to be within a range of 7.0 to 11.0 and then heat-treating the aqueous solution A at a temperature within a range of 40 to 180° C. for a time within a range of ten minutes to 48 hours to obtain silica-alumina slurry A.

In step (B) of the method for preparing the silica-alumina powder according to aspects of the present invention, the pH of the aqueous solution A obtained in step (A) is adjusted to be 8.0 or higher, and then the aqueous solution A is heat-treated at a temperature within a range of 40 to 180° C. for a time within a range of ten minutes to 48 hours. Thus, homogeneity of the silica-alumina powder can be secured.

The pH of the aqueous solution A in this step is within a range of 7.0 to 11.0. The pH falling excessively outside this range is not preferable, because a homogeneous reaction between silica and alumina does not occur and the silica-alumina does not exhibit high thermal stability, moderate acid density, and high Lewis acid strength. The temperature of the aqueous solution or water vapor is preferably within a temperature range of 40 to 180° C. The temperature lower than this lower limit is not preferable, because the reaction of the silica-alumina precursor becomes insufficient. The temperature exceeding this upper limit is not preferable, because melting of the silica-alumina progresses and the silica-alumina does not exhibit high thermal stability, moderate acid density, and high Lewis acid strength. That is, the heat treatment is performed by bringing the solid obtained in step (A) into contact with water (a gas phase or a liquid phase). The heat treatment may be performed at any stage during preparation. The mobility of the silica component may be increased by this treatment, but the present invention is not limited by that.

<Step (C)>

A step of cooling the aqueous solution heat-treated in step (B) or silica-alumina slurry obtained by the heat treatment, then separating and washing a solid, and then drying or further calcining the solid to obtain a silica-alumina powder This is a step of obtaining a silica-alumina powder by performing washing and drying (calcining). An ordinary method can be used. For example, to obtain silica-alumina particles by drying, a spray dryer or other drying devices that are commonly used can be used.

[Method for Producing Fluid Catalytic Cracking Catalyst]

The method for producing a fluid catalytic cracking catalyst includes:

(1) a step of mixing the silica-alumina powder component, a binder component, a clay component (a bulking agent), a zeolite component, and an additive agent to obtain mixed slurry;

(2) a step of spray-drying the mixed slurry obtained in step (1) to obtain dry particles; and (3) a step of washing and drying the dry particles obtained in step (2) to obtain a fluid catalytic cracking catalyst.

Further, the method for producing a fluid catalytic cracking catalyst includes, in place of step (3), (4) a step of washing the dry particles obtained in step (2) and then further performing rare-earth metal exchange to obtain a rare-earth-metal-exchanged fluid catalytic cracking catalyst.

The method for producing a fluid catalytic cracking catalyst can be implemented by the method described in Japanese Patent Laid-Open No. 2020-032350 or Japanese Patent Laid-Open No. 2020-032352.

First Embodiment

[Porous Silica-Alumina Particles]

A silica-alumina powder according to a first embodiment is amorphous porous silica-alumina particles that have a large specific surface area and a large pore volume and are further enhanced in particle strength. The porous silica-alumina particles (hereinafter also referred to simply as "silica-alumina particles") of this embodiment are porous particles composed of silica ($SiO_2$) and alumina ($Al_2O_3$), and are formed as an oxide having a large specific surface area and a large pore volume.

<Silica Content>

In the porous silica-alumina particles of this embodiment, the ratio S/A between silica and alumina is preferably within a range of 2/98 to 70/30, and further preferably within a range of 2/98 to 65/35, as a mass ratio S/A in terms of $SiO_2$ and $Al_2O_3$, respectively. When the ratio of alumina is lower than the upper limit of S/A, the solid acid amount tends to decrease, so that these particles may fail to achieve required decomposition ratio when used as a decomposition catalyst etc. On the other hand, when the ratio of silica is lower than the lower limit of S/A, the specific surface area SA tends to decrease.

<Specific Surface Area>

In the porous silica-alumina particles of this embodiment, the specific surface area SA obtained by the BET method is preferably within a range of 400 to 600 $m^2/g$, and further preferably within a range of 420 to 550 $m^2/g$. The reason for setting the lower limit is that, when the particles are used as a decomposition catalyst, a moderately large specific surface area SA is advantageous from the viewpoint of the efficiency of contacting and reacting with hydrocarbon. On the other hand, when the specific surface area SA exceeds 600 $m^2/g$, the pore diameter PD becomes too small and becomes smaller than the size of the hydrocarbon molecule of the reactant, so that diffusion into the pores may be prevented and an effective reaction may fail to occur.

<Pore Volume>

In the porous silica-alumina particles of this embodiment, the pore volume PV obtained by the BJH method is preferably within a range of 1.0 to 2.0 ml/g, and further preferably within a range of 1.10 to 1.90 ml/g. When the pore volume PV is smaller than the lower limit, the field of an effective reaction with hydrocarbon molecules may be reduced. On the other hand, when the pore volume PV exceeds the upper limit, the crush strength or the attrition strength of a molded product to be used as a decomposition catalyst are reduced, so that the molded product may pulverize when charged into a reactor and make its operation impossible.

<Average Pore Diameter>

In the porous silica-alumina particles of this embodiment, the average pore diameter PD measured by the BJH method is within a range of 6 to 30 nm (60 to 300 Å) and preferably within a range of 7 to 18 nm (70 to 180 Å). The reason for setting the lower limit is that, when the average pore diameter PD is too small, the number of pores smaller than the size of the hydrocarbon molecule of the reactant increases, so that diffusion into the pores may be prevented and an effective reaction may fail to occur. On the other hand, the reason for setting the upper limit is that otherwise the number of active sites for the decomposition reaction may decrease as the specific surface area decreases, as well as the crush strength may decrease.

<Impurities>

One of the characteristics of the porous silica-alumina particles of this embodiment is that the residual amounts of components of cationic and anionic impurities are small. Residual cations include alkali metal ions such as residual sodium ions and potassium ions. The amount of these alkali metal ions (M+) is 0.1 mass % or less, and preferably 0.05 mass % or less, in terms of $M_2O$. Further, the residual amount of inorganic acid ions such as sulfate ions and nitrate ions is 1.0 mass % or less and preferably 0.5 mass % or less. As the impurity ion components are reduced, poisoning of solid acid sites and active metal are mitigated.

[Method for Producing Porous Silica-Alumina Particles]

<a. Step of Obtaining Aqueous Solution Including Pseudo-Boehmite Alumina Hydrate>

<<a-1. Preparation Step>>

Methods for preparing pseudo-boehmite alumina particles are widely known. Among them, a method for creating a precipitate of pseudo-boehmite alumina particles by neutralizing a solution of aluminum salt and/or aluminate is suitable. As the aluminum salt, an arbitrary aluminum salt such as aluminum sulfate, aluminum chloride, or aluminum nitrate can be used. As the aluminate, arbitrary one such as sodium aluminate or potassium aluminate can be used. For the neutralization reaction, any of the following may be used: a method of adding an alkaline aqueous solution such as sodium hydroxide, potassium hydroxide or ammonia water to an aqueous solution of an aluminum salt; a method of adding an aqueous solution of an acid such as a sulfuric acid, a hydrochloric acid, or a nitric acid to an aqueous solution of aluminate; and a method of mixing an aqueous solution of an aluminum salt and an aqueous solution of aluminate. From the viewpoint of manufacturing costs, a method of mixing an aqueous solution of an aluminum salt and an aqueous solution of aluminate to obtain an aqueous solution including pseudo-boehmite alumina hydrate is preferable.

<<a-2. Aging Step>>

After mixing the two liquids to perform a neutralization reaction, to promote the reaction into pseudo-boehmite alumina hydrate (hereinafter also referred to as "aging"), the pH of the solution is adjusted to be within a range of 7.0 to 10.0 and the temperature thereof is adjusted to be within a range of 30 to 70° C. Thus, the reaction is promoted and pseudo-boehmite alumina hydrate can be obtained. When the pH exceeds 10.0, a bayerite phase with a small specific surface area forms, so that a catalyst that is finally produced may have reduced activity. When the pH is lower than 7.0, the pore volume of pseudo-boehmite alumina particles that are finally obtained tends to decrease, which may make it difficult to produce pseudo-boehmite alumina particles suitable as a catalyst.

The temperature of aging is desirably within a range of 30 to 70° C. When the temperature is lower than 30° C., particles tend to agglomerate firmly and the pore volume of the powder obtained through the aging and drying step may become small. A temperature exceeding 70° C. is not preferable because bayerite is likely to deposit. It is desirable that the aging time be within a range of five to 120 minutes, preferably ten to 100 minutes, and further preferably ten to 90 minutes. When the temperature falls outside these ranges, pseudo-boehmite alumina particles that are finally obtained may have a pore volume of 0.8 ml/g or smaller and become unusable as pseudo-boehmite alumina particles for a catalyst. While the aging time is not particularly limited, 120 minutes or less is preferable from the perspective of production efficiency. When the aging time is too long, pseudo-boehmite alumina particles that are finally obtained tend to have a small specific surface area.

<<a-3. Washing Step>>

After the pseudo-boehmite alumina hydrate obtained in step a-2 is filtered out, a pseudo-boehmite alumina cake is obtained. This boehmite alumina cake is transferred to a washing container and washed with water at 50 to 70° C., and thereby unreacted raw materials, contaminating ions, etc. are removed to obtain a pseudo-boehmite alumina cake. Pure water is added to this pseudo-boehmite alumina cake and this mixture is stirred to produce an aqueous solution including pseudo-boehmite alumina hydrate.

<b. Step of Obtaining Aqueous Solution Including Silica Powder>

An aqueous solution including a silica powder can be obtained in accordance with the description of <Supply Source of Silica Compound> given above. An aqueous solution including a silica powder can be obtained, for example, by supplying, while stirring, an aqueous solution of silicate and an acid in a reactor held at 10 to 100° C., preferably at 20 to 95° C. In the silica powder used in this embodiment, a smaller residual amount of impurities such as contaminating ions is more preferable, and the content of $Na_2O$ is preferably within a range not exceeding 0.4 mass % and the content of sulfate ions is preferably within a range not exceeding 0.5 mass %. It is more preferable that the content of $Na_2O$ be within a range not exceeding 0.10 mass % and that the content of sulfate ions be within a range not exceeding 1.0 mass %. According to this preparation method, an aqueous solution including silica powder of which the specific surface area obtained by the BET method falls within a range of 190 to 800 $m^2/g$ can be easily obtained.

<Step (A)>

An aqueous solution including the above-described pseudo-boehmite alumina hydrate with the solid content concentration adjusted to 5 to 15 mass % and an aqueous solution including the above-described silica powder with the solid content concentration adjusted to 10 to 30 mass % are mixed. In this process, the aqueous solution of the silica powder may be added to the aqueous solution including the pseudo-boehmite alumina hydrate, or the aqueous solution including the pseudo-boehmite alumina hydrate may be added to the aqueous solution of the silica powder.

<Step (B)>

The pH of the aqueous solution including the silica-alumina mixture obtained in step (A) is adjusted to be within a range of 7.0 to 9.0, more preferably within a range of 7.5 to 9.0, and this solution is aged at a temperature within a range of 40 to 95° C. for ten minutes to ten hours.

<Step (C)>

In this embodiment, to obtain silica-alumina particles by drying, a spray dryer or other drying devices that are commonly used can be used. While the drying temperature is not particularly limited, too high a temperature causes a phase transition from pseudo-boehmite alumina to gamma-alumina and is therefore not preferable. Thus, an inlet temperature of 500° C. or lower and an outlet temperature of 200° C. or lower are preferable, i.e., drying at an inlet temperature within a range of 300 to 500° C. and an outlet temperature within a range of 130 to 200° C. is preferable.

The obtained silica-alumina particles are suspended in water and stirred as necessary and then filtered out and washed to obtain a cake of silica-alumina particles. To reduce the concentration of residual alkali metal ions in the silica-alumina particles, it is preferable that a temperature of the suspension within a range of 40 to 70° C. be used, and that the suspension be filtered out using an aqueous solution including a water-soluble acidic substance. Examples of the water-soluble acidic substance used here include ammonium sulfate, ammonium nitrate, and ammonium chloride.

Further, to remove residual salt etc. after filtration, washing and filtration are performed using warm water etc. including a water-soluble basic substance, and thus a cake of silica-alumina particles can be obtained. To increase the efficiency of removing unreacted raw materials, contaminating ions, etc., it is preferable that a temperature of the washing water within a range of 50 to 70° C., higher than room temperature, be used. Examples of the water-soluble basic substance used here include ammonia water, a hydroxide salt, carbonate, and hydrogencarbonate. (The salt here means an alkali metal salt and an alkaline-earth metal salt.) Depending on the residual amounts of impurities such as contaminating ions, the drying step may be repeated thereafter, and further the washing step may be performed again as necessary.

Second Embodiment

A second embodiment is a silica-alumina powder obtained by mixing alumina hydrate and sodium silicate or a silica sol precursor, for example, silicate or silicic acid obtained by adding an acid to silicate (or colloidal silica). It was found that the silica-alumina powder of this embodiment was characterized by having a large specific surface area and varying in acidic properties, acid strength distribution, etc., and further that a fluid catalytic cracking catalyst including the silica-alumina powder of this embodiment was excellent in decomposition performance for heavy fractions (bottoms) and was particularly excellent in coke/bottom selectivity and gasoline selectivity.

<Silica-Alumina Powder>

It is preferable that the silica-alumina powder of this embodiment be non-zeolitic and have the following characteristics:

- that $SiO_2$ is contained within a range of 5 to 30 mass %;
- that the specific surface area measured by the BET method is within a range of 350 to 550 $m^2/g$;
- that the pore volume measured using a nitrogen adsorption isotherm is within a range of 0.70 to 1.20 ml/g; and
- that, in an acidity measured by IR monitoring of thermal desorption of pyridine, the silica-alumina powder has a Broensted acid, with an amount of Lewis acid being within a range of 200 to 400 μmol/g.

In the silica-alumina powder according to this embodiment, it is preferable that the amount of ammonia desorption as the acid amount calculated from an $NH_3$-TPD measurement be within a range of 500 to 700 μmol/g, and that the ratio of the acid amount at a desorption temperature of 400 to 500° C. be 10% or higher relative to the total acid amount.

<Silica Content>

The silica-alumina powder according to this embodiment is a non-zeolitic substance. The silica component is included in this powder within a range of 5 to 30 mass %. The content is preferably within a range of 7 to 28 mass %, and further preferably within a range of 10 to 25 mass %. When the content is lower than 5 mass %, performance may become inadequate due to the small specific surface area and acid amount. When the content exceeds 30 mass %, the specific surface area and the acid amount decrease and the performance also degrades, as well as the $SiO_2$ content becomes higher, which may lead to degradation of the catalyst in terms of the bulk density (ABD) and attrition resistance.

<Specific Surface Area>

The specific surface area of the silica-alumina powder according to this embodiment is preferably 350 to 550 $m^2/g$. The specific surface area is further preferably within a range of 400 to 500 $m^2/g$.

<Method for Producing Silica-Alumina Powder>

The method for producing the silica-alumina powder according to this embodiment includes:

(A) a step of mixing an aqueous solution including alumina hydrate and an aqueous solution containing a silica precursor to prepare an aqueous solution A including a silica-alumina precursor;

(B) a step of adjusting the pH of the aqueous solution A including the silica-alumina precursor obtained in step (A) to be within a range of 9.0 to 11.0, and then heat-treating the aqueous solution A at a temperature within a range of 80 to 100° C. for a time within a range of 0.5 to 12 hours; and (C) a step of cooling the aqueous solution heat-treated in step (B), then separating and washing a solid, and then drying or further calcining the solid to obtain a silica-alumina powder.

<Step (A)>

In this embodiment, when performing step (A), it is effective to select an alumina compound that is partially soluble in an acidic medium from a group of alumina compounds represented by a general formula $Al_2O_3 \cdot nH_2O$ ($n \leq 5$) and having a specific surface area of 150 to 600 $m^2/g$. In particular, a hydrated alumina compound such as boehmite, pseudo-boehmite, or amorphous or basically amorphous alumina gel may be used.

<Step (B)>

In step (B) of the method for preparing the silica-alumina powder of this embodiment, the pH of the aqueous solution A obtained in step (A) is adjusted to be within a range of 9.0 to 11.0, and is then heat-treated at a temperature within a range of 80 to 100° C. for a time within a range of 0.5 to 12 hours. Thus, homogeneity of the silica-alumina powder can be secured. The pH of the aqueous solution A in this step is preferably within a range of 9.0 to 11.0, and further preferably within a range of 9.5 to 10.5. The pH falling excessively outside the range of 9.0 to 11.0 is not preferable because the specific surface area and the acid amount decrease. The temperature of the aqueous solution is preferably within a temperature range of 80 to 100° C. A temperature lower than 80° C. is not preferable, because the reaction of the silica-alumina precursor becomes insufficient and the acid amount and the acid strength decrease. A temperature exceeding 100° C. is not preferable, because the growth of silica-alumina particles progresses and the specific surface area and the acid amount decrease. That is, a hydrothermal treatment is performed by bringing the solid obtained in step (A) into contact with water (a gas phase or a liquid phase). The hydrothermal treatment may be performed at any stage during preparation. The mobility of the silica component may be increased by this treatment, but the present invention is not limited by that. The time of the heat treatment exceeding 12 hours does not have any further effect.

<Step (C)>

In this embodiment, an ordinary method can be employed for separation, washing, drying, or calcining of a solid in the step of obtaining the silica-alumina powder.

Third Embodiment

In a third embodiment, it was found that using highly crystalline boehmite as alumina hydrate could produce silica-alumina that was suitably used as a fluid catalytic cracking catalyst. The principle is presumed to be as follows. Highly crystalline boehmite has a more regular arrangement, and allows a crystal plane where a reaction with silica occurs to be appropriately controlled, so that specific strong acid sites can be developed in silica-alumina. Further, when highly crystalline boehmite is used, the silica-alumina has a larger acid amount per surface area as well as higher thermal stability, and therefore can be expected to remain highly active for a long period of time when used as a fluid catalytic cracking catalyst.

<Silica-Alumina Powder>

The silica-alumina powder of this embodiment has the following characteristics:

a. that $SiO_2$ is contained within a range of 8 to 20 mass %;

b. that the crystallite diameter in a boehmite alumina (020) plane obtained by X-ray diffraction is 10 to 50 nm;

c. that the specific surface area of the silica-alumina powder is within a range of 90 to 230 $m^2/g$;

d. that an acid density that is an amount of acid per surface area is within a range of 0.75 to 1.00 $\mu mol/m^2$;

e. that, in a TG-DTA measurement (a thermogravimetry-differential thermal analysis measurement), the temperature of crystal transformation from boehmite alumina to gamma alumina is 470° C. or higher; and f. that, in a CO adsorption FT-IR measurement (a measurement by a Fourier transform infrared spectrophotometer), a Lewis acid exhibiting a peak near 2230 $cm^{-1}$ is present.

<Silica Content>

The silica-alumina powder according to this embodiment is a non-zeolitic substance. It is preferable that the silica component be included in this powder within a range of 8 to 20 mass %. The content is preferably within a range of 8 to 17 mass %, and further preferably within a range of 9 to 15 mass %. When the content falls below the lower limit value, the temperature of crystal transformation becomes low, and moreover, in a CO adsorption FT-IR measurement (a measurement by a Fourier transform infrared spectrophotometer), a strong Lewis acid exhibiting a peak near 2230 $cm^{-1}$ becomes no longer present, so that the performance may become inadequate. When the content exceeds the upper limit value, the silica-alumina may fail to achieve sufficient acid density when used as a fluid catalytic cracking catalyst.

<X-Ray Diffraction Measurement Conditions>

The X-ray diffraction of the silica-alumina powder was measured with MiniFlex manufactured by Rigaku Corporation. The measurement conditions are as follows: The operating axes were 2θ/θ, and CuKα was used as a radiation source. A continuous measurement method was used. The voltage was 40 kV and the current was 15 mA. From a start angle of 2θ=5° to an end angle of 2θ=90°, the sampling width was 0.020° and the scan speed was 10.000°/min.

Using Scherrer equation below, the crystallite diameter D of boehmite-type alumina was calculated with respect to a boehmite alumina (020) plane (2θ=14.0 to 15.0°):

Crystallite diameter=(K×λ)/(β×cos θ)

K (shape factor): 0.9400

λ (X-ray wavelength): 0.15418 nm

β (correction of spread of line width specific to device): full width at half maximum θ: Bragg angle (°)

It is preferable that, in the silica-alumina powder according to this embodiment, the crystallite diameter in the boehmite alumina (020) plane be 10 to 50 nm, preferably 10 to 45 nm. When the crystallite diameter falls below the lower limit value, the silica-alumina used as a fluid catalytic cracking catalyst does not exhibit high thermal stability and sufficient acid density, and moreover, in a CO adsorption FT-IR measurement (a measurement by a Fourier transform infrared spectrophotometer), it does not exhibit high Lewis acid strength indicating a peak near 2230 $cm^{-1}$. When the upper limit value is exceeded, the surface area and the acid amount decrease significantly, which may result in reduced catalytic activity.

<Specific Surface Area>

The specific surface area of the silica-alumina according to this embodiment is preferably within a range of 90 to 230 $m^2/g$. The specific surface area is further preferably within a range of 100 to 210 $m^2/g$.

<Acid Density>

The acid density (μmol/$m^2$) that is the amount of acid per surface area was obtained from a sum (μmol/g) of a Broensted acid amount and a Lewis acid amount measured by the above-described pyridine adsorption FT-IR and the above-described BET specific surface area ($m^2/g$).

The acid density of the silica-alumina according to this embodiment is preferably within a range of 0.75 to 1.00 μmol/$m^2$. The acid density is more preferably within a range of 0.80 to 1.00 μmol/$m^2$, and further preferably within a range of 0.80 to 0.90 μmol/$m^2$. With the acid density being within this range, the silica-alumina can have sufficient catalytic activity when used as a fluid catalytic cracking catalyst.

<TG-DTA (Thermogravimetry-Differential Thermal Analysis) Measurement>

Using a TG-DTA (thermogravimetry-differential thermal analysis) device (Thermo Plus TG8120) manufactured by Rigaku Corporation, the thermal behavior of a powdery specimen was recorded by conducting a measurement up to 1000° C. at a temperature rising speed of 10° C./min while air was introduced at a blow-in speed of 50 ml/min. As a standard substance, alpha alumina was used.

The temperature of crystal transformation from boehmite alumina to gamma alumina of the silica-alumina according to this embodiment is preferably 470° C. or higher. When the temperature is in this temperature region, the silica-alumina can be said to have high thermal stability.

<CO Adsorption FT-IR Measurement>

Figure 2:
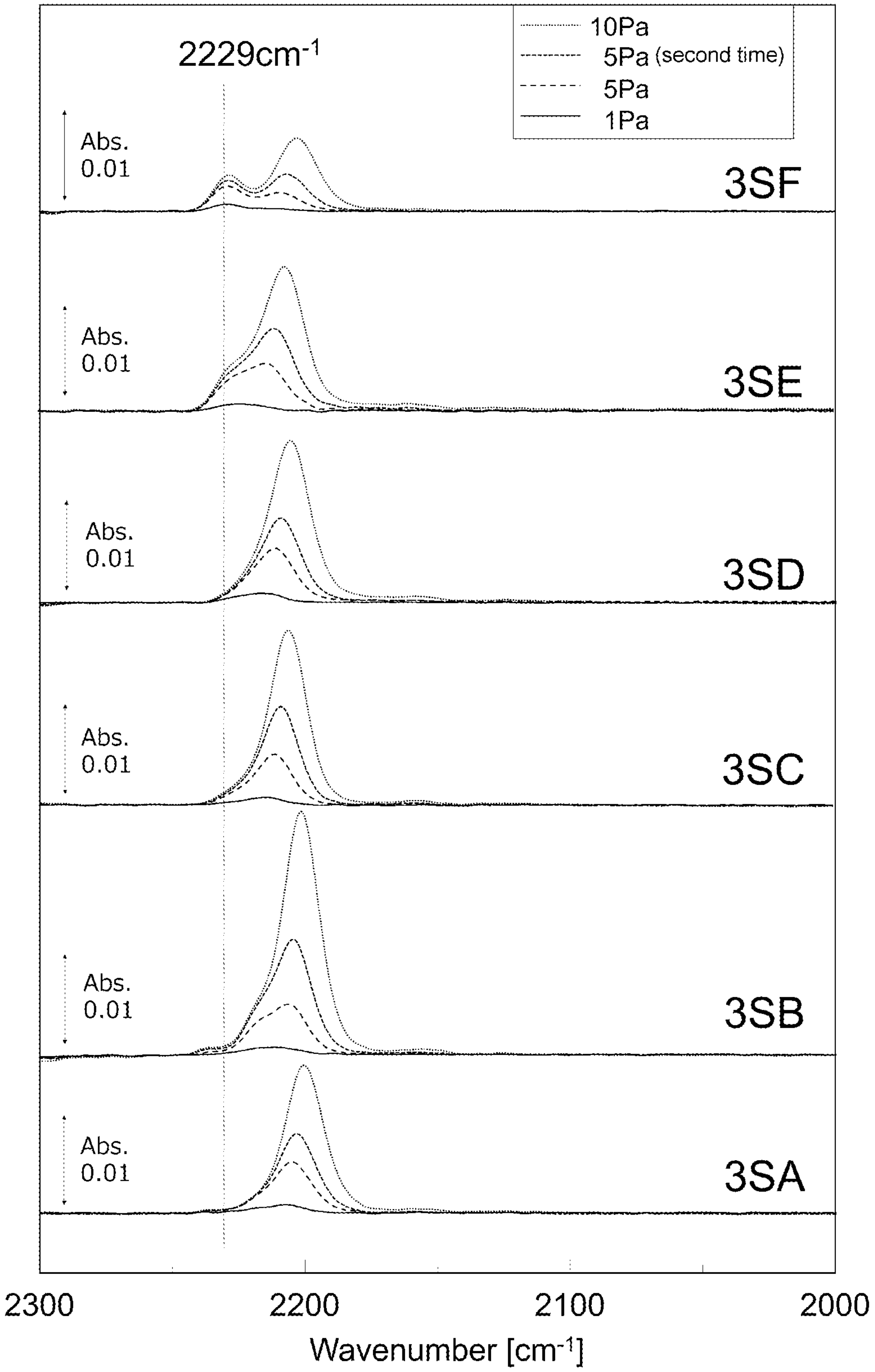
FIG. 2 is a graph obtained by a CO adsorption FT-IR measurement of silica-alumina powders 3SA to 3SF.

30 mg of the silica-alumina powder was molded into a disc with a diameter of 20 mm, then installed in an IR cell connected to a vacuum line, and subjected to a vacuum evacuation treatment at 500° C. for one hour. After pretreatment, the temperature was lowered to minus 176° C., and an inert gas (He) was introduced at 100 Pa to bring the temperature of the specimen close to minus 176° C. Then, the IR cell was evacuated, and changes in the IR spectrum attributable to stretching vibration of CO when CO was gradually introduced at 1 Pa, 5 Pa, 5 Pa (second time), and 10 Pa were ascertained. FIG. 1 and FIG. 2 show difference spectra before and after introduction of CO. As the Lewis acid strength becomes higher, stretching vibration of CO shifts farther toward the higher wavenumber, and the appearance of a peak near 2230 $cm^{-1}$ indicates the presence of a Lewis acid with high acid strength.

In the silica-alumina according to this embodiment, it is preferable that a Lewis acid exhibiting a peak near 2230 $cm^{-1}$ in a CO adsorption FT-IR measurement be present.

<Method for Producing Silica-Alumina Powder>

The method for producing the silica-alumina powder according to this embodiment includes:

(A) a step of mixing an aqueous solution including alumina hydrate and an aqueous solution containing a silica precursor to prepare an aqueous solution A including a silica-alumina precursor;

(B) a step of adjusting the pH of the aqueous solution A including the silica-alumina precursor obtained in step (A) to 8.0 or higher, and then heat-treating the aqueous solution A at a temperature within a range of 70 to 180° C. for two hours or longer to obtain silica-alumina slurry A; and (C) a step of separating a solid from the silica-alumina slurry A to obtain a silica-alumina powder, or performing washing and drying (calcining) as necessary to obtain a silica-alumina powder.

Here, as the alumina raw material used in step (A), a material of which the crystallite diameter in a boehmite alumina (020) plane obtained by X-ray diffraction is 10 to 50 nm is used, and the mass ratio of silica to alumina is adjusted to be within a range of 8/92 to 20/80.

<Alumina Raw Material>

For the alumina raw material, it is preferable that the crystallite diameter in the boehmite alumina (020) plane obtained by X-ray diffraction described above be within a range of 10 to 50 nm, preferably within a range of 10 to 45 nm. When a material falling below the lower limit is used as the raw material of the silica-alumina powder, the thermal stability and the acid properties cannot be appropriately controlled due to the low crystallinity of boehmite alumina. When a material exceeding the upper limit is used as the raw material of the silica-alumina powder, the surface area and the acid amount decrease as well as the catalyst activity decreases due to the small surface area of boehmite alumina.

The raw material may be selected from commercially available alumina products, or may be prepared using aqueous solutions of alkali metal aluminate and aluminum salt.

For example, an aqueous solution of aluminum sulfate is added to an aqueous solution of sodium aluminate and the mixture is stirred. The obtained alumina slurry is washed with warm water. The dry weights of $Na_2O$ and $SO_4$ in the washed alumina cake should be 2% or less and 1% or less, respectively. Next, the washed alumina cake is dispersed in pure water to produce washed alumina slurry. Then, an aqueous solution of sodium hydroxide is added to adjust the pH, and the washed aluminum slurry is aged while being stirred. After aging, it is cooled to obtain crystalline boehmite slurry.

<Aqueous Solution Containing Silica Precursor>

In a form of implementation of step (A) of the method for producing the silica-alumina powder according to aspects of the present invention, an aqueous solution including alumina hydrate and an aqueous solution containing a silica precursor are mixed. It is preferable that the supply source of the silica compound be selected from the group consisting of silicic acid, a silicic colloidal solution, water-soluble silicate, cationic silicon salt (hydrated sodium metasilicate etc.), LUDOX ((R), ammonia type or alkali type), and quaternary ammonium silicate. Preparation of a silicic colloidal solution may be performed using a method commonly known to those skilled in the art. As the silica compound, a desalted silicic acid solution is preferable. As the supply source of this completely soluble silicon compound, an orthosilicic acid solution ($H_2SiO_4$, $H_2O$) prepared by performing ion exchange of water-soluble alkaline silicate on resin may be used.

<Step (A)>

Step (A) is the same as that of the second embodiment.

<Step (B)>

In step (B) of the method for preparing the silica-alumina powder of this embodiment, the pH of the aqueous solution A obtained in step (A) is adjusted to be within a range of 8.0 to 11.0, and is then heat-treated at a temperature within a range of 70 to 180° C. for a time within a range of two hours to 48 hours. This step is preferable as it can secure homogeneity of the silica-alumina powder.

The pH of the aqueous solution A in this step is further preferably within a range of 9.0 to 11.0. The pH falling excessively outside this range is not preferable, because a homogeneous reaction between silica and alumina does not occur, and the silica-alumina does not exhibit high thermal stability, moderate acid density, and high Lewis acid strength. The temperature of the aqueous solution (including water vapor) is preferably within a temperature range of 70 to 180° C. A temperature lower than this lower limit is not preferable because the reaction of the silica-alumina precursor becomes insufficient. A temperature exceeding this upper limit is not preferable, because dissolution of the silica-alumina progresses and the silica-alumina does not exhibit high thermal stability, moderate acid density, and high Lewis acid strength. That is, the heat treatment is performed by bringing the solid obtained in step (A) into contact with water (a gas phase or a liquid phase). The heat treatment may be performed at any stage during preparation. The mobility of the silica component may be increased by this treatment, but the present invention is not limited by that. While an upper limit of the time of the heat treatment is not particularly provided, the upper limit is preferably about 48 hours in consideration of economic efficiency.

<Step (C)>

This is a step of obtaining a silica-alumina powder by performing washing and drying (calcining). An ordinary method can be used.

Example 1

In the following, examples will be shown and these examples will be specifically described, but the present invention is not limited by these examples.

[1-1]

(Step a-1). Step of Obtaining Aqueous Solution Including Pseudo-Boehmite Alumina Hydrate 60 kg of water was poured into a steam-jacketed stainless-steel tank with a 200 L capacity, and while this water was being stirred, 24 g of an aqueous solution of 25 mass % sodium gluconate was fed. Then, 885 g of an aqueous solution of sodium aluminate containing 22.6 mass % $Al_2O_3$ and 17.3 mass % $Na_2O$ was fed, and subsequently 1408 g of an aqueous solution of 24 mass % aluminum sulfate was fed over two minutes, to prepare pseudo-boehmite alumina seed slurry with a pH of 7.2. An aqueous solution of sodium aluminate containing 22.6 mass % $Al_2O_3$ and 17.3 mass % $Na_2O$ and a solution of 23.6 mass % aluminum sulfate were dripped into this seed slurry at flow rates of 275 ml/min and 488 ml/min, respectively, for 20 minutes while the temperature was held at 60° C. The pH of the finished slurry was 7.2. After five minutes of stirring, the pH was adjusted to 8.8 using 642 g of an aqueous solution of sodium aluminate containing 22.6 mass % $Al_2O_3$ and 17.3 mass % $Na_2O$, and stirring was continued at 60° C. for two hours. As the pH of the slurry decreased to 7.05, it was adjusted to 8.8 again using 15% ammonia water, and thus pseudo-boehmite alumina slurry was obtained.

(Step a-2) Washing Step

The pseudo-boehmite alumina slurry of step a-1 was filtered out, and the obtained pseudo-boehmite alumina cake was washed with 105 L of water at 60° poured over it to remove sulfate ions and sodium ions.

The weight of the washed pseudo-boehmite alumina cake was 38.4 kg, and the solid content concentration was 8.6%. (As for the contents of impurities at this stage, the concentration in terms of $Na_2O$ based on dry substance was 0.1 mass % and the $SO_4^{2-}$ concentration was 1.0 mass %.)

14.3 kg of pure water was added to 38.4 kg of the pseudo-boehmite alumina cake, and this mixture was stirred to obtain an aqueous solution including pseudo-boehmite alumina hydrate.

(Step c-1) Step of Obtaining Aqueous Solution Including Silica-Alumina Mixture

The above aqueous solution including pseudo-boehmite alumina hydrate and silica powder 1A (SYLYSIA 780 manufactured by FUJI SILYSIA CHEMICAL LTD.) of Table 1 were mixed to obtain an aqueous solution including a silica-alumina particle mixture.

2.21 kg on a dry basis of silica powder 1A of Table 1 was added to the aqueous solution including pseudo-boehmite alumina hydrate, and then the pH was adjusted to 8.2 using 260 ml of 15% ammonia water.

(Step c-2) Aging Step

The aqueous solution including a silica-alumina particle mixture of step c-1 was transferred to a steam-jacketed stainless-steel tank, and was stirred and aged at 50° C. for two hours.

(Step d) Drying Step

The aqueous solution including a silica-alumina particle mixture of step c-2 was processed in emulsification equipment, and then spray-drying was used to obtain silica-alumina particles 1-1. Table 2 shows a result of calculating the yield from the weight and the moisture of the product upon completion of drying and the properties thereof.

[1-2]

Under the conditions described in [1-1], instead of silica powder 1A, silica powder 1B (SYLYSIA 250 manufactured by FUJI SILYSIA CHEMICAL LTD.) shown in Table 1 was used to obtain silica-alumina particles 1-2. (The other conditions are the same as in [1-1].)

[1-3]

Under the conditions described in [1-1], in (step c-1), the step of obtaining an aqueous solution including a silica-alumina mixture, the pH was adjusted to 7.8 using 200 ml of 15% ammonia water, and the aqueous solution was aged and dried under the same conditions as in [1-1] to obtain silica-alumina particles 1-3.

[1-4]

Under the conditions described in [1-1], in (step c-1), the step of obtaining an aqueous solution including a silica-alumina mixture, the pH was adjusted to 8.5 using 340 ml of 15% ammonia water, and the aqueous solution was aged and dried under the same conditions as in [1-1] to obtain silica-alumina particles 1-4.

[1-5]

Under the conditions described in [1-1], in (step c-1), the step of obtaining an aqueous solution including a silica-alumina mixture, the pH was adjusted to 9.5 using 1400 ml of 15% ammonia water, and the aqueous solution was aged and dried under the same conditions as in [1-1] to obtain silica-alumina particles 1-5.

[1-6]

Under the conditions described in [1-1], in (step c-1), 1.35 kg on a dry basis of silica powder A was added, and then the pH was adjusted to 8.2 using 260 ml of 15% ammonia water. The aqueous solution was aged and dried under the same conditions as in [1-1] to obtain silica-alumina particles 1-6.

[1-7]

Under the conditions described in [1-1], in (step c-1), 3.15 kg on a dry basis of silica powder A was added, and then the pH was adjusted to 8.2 using 300 ml of 15% ammonia water. The aqueous solution was aged and dried under the same conditions as in [1-1] to obtain silica-alumina particles 1-7.

[1-8]

Under the conditions described in [1-1], in (step c-1), 3.15 kg on a dry basis of silica powder A was added, and then the pH was adjusted to 7.2 using 160 ml of 15% ammonia water. The aqueous solution was aged and dried under the same conditions as in [1-1] to obtain silica-alumina particles 1-8.

[1-9]

Under the conditions described in [1-1], the silica powder used in (step c-1) was replaced with silica hydrogel prepared by the following method, and (step c) and the subsequent steps were changed to (step c') to prepare a silica-alumina powder.

<Method for Preparing Silica Hydrogel>

4.72 kg of 25 mass % sulfuric acid and 2.0 kg of pure water were poured into a plastic tank with a 40 L capacity, and the temperature was adjusted to 30° C. While this sulfuric acid solution was stirred, a sodium silicate solution with a $SiO_2$ concentration of 8.5 mass % and a molar ratio $SiO_2/Na_2O$ of 3.2, adjusted to 45° C., was dripped at a flow rate of 0.56 kg/min for 45 minutes, and then this sodium silicate solution was dripped at a lowered flow rate of 0.1 kg/min for 30 minutes until a pH of 4.0 was reached. After completion of dripping, stirring was continued for 165 minutes to obtain an aqueous solution of silica hydrogel. 400 ml of 15% ammonia water was added to this silica hydrogel to adjust the pH to 7.0, and silica hydrogel aged for one hour was obtained.

(Step c')

78,191 g of the aqueous solution including pseudo-boehmite alumina hydrate and 893 g of the above-described aqueous solution of silica hydrogel were stirred and mixed. Then, the pH was adjusted to 8.8 with 15 mass % ammonia water, and the aqueous solution was aged at a temperature of 40 to 60° C. for ten minutes to obtain an aqueous solution including a silica-alumina mixture.

(Step d'). First Washing Step

The aqueous solution including a silica-alumina mixture obtained in step c' was filtered out, and the silica-alumina mixture cake 1*a* filtered out was washed with 105 L of water at 600 poured over it to remove sulfate ions and sodium ions. (As for the contents of impurities at this stage, the concentration in terms of $Na_2O$ based on dry substance was 0.1 mass % and the $SO_4^{2-}$ concentration was 2.1 mass %.)

(Step e'). Step of Obtaining Silica-Alumina Gel Slurry 7 kg of warm pure water at 60° C. was added to the silica-alumina mixture cake 1*a* obtained in step d', weighing 23.0 kg, to adjust the silica-alumina concentration to 10 mass %, and then the mixture was stirred and turned into slurry. This slurry had a temperature of 45° C. and a pH of 8.7. 1.8 L of 15 mass % ammonia water was added to this slurry to adjust the pH to 10.8. Then, the slurry was transferred to a steam-jacketed sealed tank with a 50 L capacity and aged at 95° C. for ten hours.

(Step f'). First Drying Step

The aged slurry obtained in step e' was homogenized by an emulsifier and then dried by a spray-drying device at an inlet temperature of 300° C. and an outlet temperature of 150° C. to obtain silica-alumina particles 1a with an average particle diameter of 70 μm.

(Step g'). Second Washing Step 300 g on a dry basis of the silica-alumina particles 1a obtained in step f' were suspended in 3000 g of 10 mass % ammonium sulfate at 60° C. and stirred for 20 minutes. Then, the solid and the liquid were separated by a vacuum filter, and the remaining cake was poured with 3000 g of warm pure water at 60° C. and re-suspended. Subsequently, the pH was adjusted to 8.8 using 15 mass % ammonia water and the mixture was stirred for 20 minutes. Then, the solid and the liquid were separated by a vacuum filter to obtain a silica-alumina mixture cake 2*a*.

(Step h'). Second Drying Step

The obtained silica-alumina particle cake 2*a* was taken out of the filter into a stainless-steel vat and dried overnight at 130° C. to obtain the intended silica-alumina particles 1-9.

TABLE 1

| Silica powder | | 1A | 1B |
|---|---|---|---|
| LOI(1000° C. × 1 h) | mass % | 14.26 | 12.02 |
| $Na_2O$ (Dry) | mass % | 0.02 | 0.08 |
| $SO_4$ (Dry) | mass % | 0.05 | 0.01 |
| Average particle diameter | μm | 11.3 | 8.5 |
| Specific surface area SA | $m^2/g$ | 598 | 203 |

TABLE 2

| | | | | | | | | | | | |
|---|---|---|---|---|---|---|---|---|---|---|---|
| | Silica-alumina species | | 1-1 | 1-2 | 1-3 | 1-4 | 1-5 | 1-6 | 1-7 | 1-8 | 1-9 |
| | Silica powder species | | 1A | 1B | 1A | 1A | 1A | 1A | 1A | 1A | Silica hydrogel |
| | Spray-dry yield based on $SiO_2$—$Al_2O_3$ | mass % | 95.3 | 93.9 | 95.5 | 93.8 | 95.7 | 94.8 | 96.1 | 92.0 | 82.5 |
| Analysis item | LOI (1000° C. × 1 h) | mass % | 20.9 | 21.7 | 21.3 | 22.6 | 20.3 | 23.9 | 20.1 | 21.3 | 16.5 |
| | $Al_2O_3$ | mass % | 56.92 | 58.35 | 57.88 | 57.11 | 56.44 | 67.58 | 48.17 | 56.69 | 58.48 |
| | $SiO_2$ | mass % | 42.43 | 40.99 | 41.45 | 42.26 | 42.92 | 31.67 | 51.30 | 42.25 | 41.46 |
| | $Na_2O$ (Dry) | mass % | 0.04 | 0.06 | 0.04 | 0.04 | 0.04 | 0.02 | 0.03 | 0.06 | 0.01 |
| | $SO_4$ (Dry) | mass % | 0.61 | 0.60 | 0.63 | 0.59 | 0.60 | 0.73 | 0.50 | 1.00 | 0.05 |
| | $SiO_2/Al_2O_3$ | mass ratio | 43/57 | 41/59 | 42/58 | 43/57 | 43/57 | 32/68 | 52/48 | 43/57 | 41/59 |
| $N_2$ BJH | Pore volume PV | ml/g | 1.56 | 1.38 | 1.20 | 1.70 | 1.62 | 1.50 | 1.58 | 1.11 | 1.6 |
| | Average pore diameter PD | nm | 13 | 12 | 14 | 18 | 26 | 15 | 13 | 8 | 12 |
| | BET specific surface area SA | $m^2/g$ | 541 | 485 | 495 | 517 | 405 | 537 | 528 | 474 | 475 |
| | CAI | % | 6.3 | 5.8 | 4.6 | 7.2 | 9.7 | 7.8 | 4.8 | 4.2 | 18.8 |
| | Crystallinity (X-ray diffraction) | | amorphous | amorphous | amorphous | amorphous | amorphous | amorphous | amorphous | amorphous | amorphous |

As is clear from Table 2, it can be seen that, compared with silica-alumina species 1-9, silica-alumina species 1-1 to 1-8 have higher spray-dry yields and are excellent in particle strength, with the CAIs lower than 10.

Example 2

(2-1)

Preparation of Pseudo-Boehmite Slurry 9.09 kg of an aqueous solution of 22 mass % sodium aluminate (manufactured by JGC Catalysts and Chemicals Ltd.) based on an $Al_2O_3$ concentration was put into a steam-jacketed tank with a 100 L capacity, and was diluted with pure water until the weight reached 40.00 kg. Then, 60.0 g of 99 mass % sodium gluconate (manufactured by FUSO CHEMICAL CO., LTD.) was added, and the aqueous solution was warmed to 60° C. while being stirred to prepare an aqueous solution of sodium aluminate containing 5 mass % sodium gluconate (L1).

Further, 14.29 kg of an aqueous solution of 7 mass % aluminum sulfate (manufactured by JGC Catalysts and Chemicals Ltd.) based on an $Al_2O_3$ concentration was diluted with 25.71 kg of ion-exchanged water and warmed to 60° C. to prepare an aluminum sulfate aqueous solution (L2).

Next, while the sodium aluminate aqueous solution (L1) was stirred, the aluminum sulfate aqueous solution (L2) was added thereto over ten minutes to prepare a precursor of pseudo-boehmite slurry.

The obtained mixed slurry was aged at 60° C. for 60 minutes while being stirred, and was then dehydrated by a flat-plate filter. Thereafter, the filtration residue was washed with warm water at 60° C. to obtain a washed cake. The washed cake was re-slurried so as to have a solid content concentration of 15 mass %, and thus pseudo-boehmite slurry was obtained.

Preparation of Silica-Alumina No. 2S1

15.60 kg of water glass (No. 3 water glass, medium-purity sol manufactured by FUJI CHEMICAL CO., LTD., adjusted to 24 mass % based on $SiO_2$) was added to 100 kg of the pseudo-boehmite slurry (15 mass % based on an $Al_2O_3$ concentration) warmed to 45° C. to obtain suspended slurry including 20 mass % $SiO_2$. After the temperature of this suspended slurry was adjusted to 45° C., sulfuric acid (concentration 25 mass %) was added to adjust the pH to 10.0. Next, the obtained suspended slurry was warmed to 95° C. and held for one hour, and was then cooled to 60° C. or lower. The obtained slurry was filtered and then washed with warm water at 60° C. and an ammonium sulfate aqueous solution. The washed cake was dried at 150° C. to obtain silica-alumina No. 251. Table 3 shows the properties of silica-alumina No. 2S1.

Preparation of Fluid Catalytic Cracking Catalyst No. 2C1

Water glass (No. 3 water glass adjusted to 17.5 mass % based on $SiO_2$) and sulfuric acid (adjusted to a 25 mass % concentration) were simultaneously and continuously added to prepare silica hydrosol including 12.5 mass % $SiO_2$. 737.6 g of kaolin (solid content concentration: 83 mass %), 533.3 g of active alumina powder (solid content concentration: 75 mass %), 2407 g of slurry of silica-alumina No. 2S1 (solid content concentration: 16 mass %) with the pH adjusted to 3.0 by sulfuric acid, and 783.7 g of Y-type zeolite powder (solid content concentration: 77 mass %) were added to 4000 g of the silica hydrosol to prepare mixed slurry.

This catalyst slurry was adjusted to 40° C. and then spray-dried by a spray-drying machine at an inlet temperature of 250° C. and an outlet temperature of 150° C. as liquid droplets. Thus, dry particles with an average particle diameter of 70 μm were obtained. These dry particles were washed with warm water, and were then ion-exchanged and washed with warm water using an ammonium sulfate aqueous solution and a rare-earth metal chloride aqueous solution to exchange ions so as to achieve 1.8 mass % $RE_2O_3$. The obtained washed cake was dried by a drying machine with an atmospheric temperature held at 150° C. for ten hours to obtain fluid catalytic cracking catalyst No. 2C1. Table 4 shows the catalyst composition and the catalyst properties of fluid catalytic cracking catalyst No. 2C1.

(2-2)

Preparation of Silica-Alumina No. 2S2

Silica-alumina No. 2S2 was obtained in the same manner as (2-1), except that 11.03 kg of water glass was added to 100 kg of pseudo-boehmite slurry warmed to 45° C. to obtain suspended slurry including 15 mass % $SiO_2$. Table 3 shows the properties of silica-alumina No. 2S2.

Preparation of Fluid Catalytic Cracking Catalyst No. 2C2

Fluid catalytic cracking catalyst No. 2C2 was obtained in the same manner as (2-1), except that silica-alumina No. 2S2 was used as the silica-alumina slurry. Table 4 shows the catalyst composition and the catalyst properties of fluid catalytic cracking catalyst No. 2C2.

(2-3)

Preparation of Silica-Alumina No. 2S3

Silica-alumina No. 2S3 was obtained in the same manner as (2-1), except that 20.83 kg of water glass was added to 100 kg of pseudo-boehmite slurry warmed to 45° C. to obtain suspended slurry including 25 mass % $SiO_2$. Table 3 shows the properties of silica-alumina No. 2S3.

Preparation of Fluid Catalytic Cracking Catalyst No. 2C3

Fluid catalytic cracking catalyst No. 2C3 was obtained in the same manner as (2-1), except that silica-alumina No. 2S3 was used as the silica-alumina slurry. Table 4 shows the catalyst composition and the catalyst properties of fluid catalytic cracking catalyst No. 2C3.

(2-4)

Preparation of Silica-Alumina No. 2S4

Silica-alumina No. 2S4 was obtained in the same manner as (2-1), except that suspended slurry including 20 mass % $SiO_2$ was adjusted to 45° C. and that sulfuric acid (concentration 25 mass %) was added to adjust the pH to 9.5. Table 3 shows the properties of silica-alumina No. 2S4.

Preparation of Fluid Catalytic Cracking Catalyst No. 2C4

Fluid catalytic cracking catalyst No. 2C4 was obtained in the same manner as (2-1), except that silica-alumina No. 2S4 was used as the silica-alumina slurry. Table 4 shows the catalyst composition and the catalyst properties of fluid catalytic cracking catalyst No. 2C4.

(2-5)

Preparation of Silica-Alumina No. 2S5

Silica-alumina No. 2S5 was obtained in the same manner as (2-1), except that suspended slurry including 20 mass % $SiO_2$ was adjusted to 45° C. and that sulfuric acid (concentration 25 mass %) was added to adjust the pH to 10.5. Table 3 shows the properties of silica-alumina No. 2S5.

Preparation of Fluid Catalytic Cracking Catalyst No. 2C5

Fluid catalytic cracking catalyst No. 2C5 was obtained in the same manner as (2-1), except that silica-alumina No. 2S5 was used as the silica-alumina slurry. Table 4 shows the catalyst composition and the catalyst properties of fluid catalytic cracking catalyst No. 2C5.

(2-A)

Preparation of Silica-Alumina No. 2SA

Silica-alumina No. 2SA was obtained in the same manner as (2-1), except that 1.93 kg of water glass was added to 100 kg of pseudo-boehmite slurry warmed to 45° C. to obtain suspended slurry including 3 mass % $SiO_2$. Table 3 shows the properties of silica-alumina No. 2SA.

Preparation of Fluid Catalytic Cracking Catalyst No. 2CA

Fluid catalytic cracking catalyst No. 2CA was obtained in the same manner as (2-1), except that silica-alumina No. 2SA was used as the silica-alumina slurry. Table 4 shows the catalyst composition and the catalyst properties of fluid catalytic cracking catalyst No. 2CA.

(2-B)

Preparation of Silica-Alumina No. 2SB

Silica-alumina No. 2SB was obtained in the same manner as (2-1), except that 41.7 kg of water glass was added to 100 kg of pseudo-boehmite slurry warmed to 45° C. to obtain suspended slurry including 40 mass % $SiO_2$. Table 4 shows the properties of silica-alumina No. 2SB.

Preparation of Fluid Catalytic Cracking Catalyst No. 2CB

Fluid catalytic cracking catalyst No. 2CB was obtained in the same manner as (2-1), except that silica-alumina No. 2SB was used as the silica-alumina slurry. Table 4 shows the catalyst composition and the catalyst properties of fluid catalytic cracking catalyst No. 2CB.

(2-C)

Preparation of Silica-Alumina No. 2SC

Silica-alumina No. 2SC was obtained in the same manner as (2-1), except that sulfuric acid (concentration 25 mass %) was not added to suspended slurry including 20 mass % $SiO_2$ and that the pH of the suspended slurry at 45° C. was 11.5. Table 3 shows the properties of silica-alumina No. 2SC.

Preparation of Fluid Catalytic Cracking Catalyst No. 2CC

Fluid catalytic cracking catalyst No. 2CC was obtained in the same manner as (2-1), except that silica-alumina No. 2SC was used as the silica-alumina slurry. Table 4 shows the catalyst composition and the catalyst properties of fluid catalytic cracking catalyst No. 2CC.

(2-D)

Preparation of Silica-Alumina No. 2SD Silica-alumina No. 2SD was obtained in the same manner as (2-1), except that suspended slurry including 20 mass % $SiO_2$ was adjusted to 45° C. and that sulfuric acid (concentration 25 mass %) was added to adjust the pH to 8.5. Table 3 shows the properties of silica-alumina No. 2SD.

Preparation of Fluid Catalytic Cracking Catalyst No. 2CD

Fluid catalytic cracking catalyst No. 2CD was obtained in the same manner as (2-1), except that silica-alumina No. 2SD was used as the silica-alumina slurry. Table 4 shows the catalyst composition and the catalyst properties of fluid catalytic cracking catalyst No. 2CD.

(2-E)

Preparation of Silica-Alumina No. 2SE

Silica-alumina No. 2SE was obtained in the same manner as (2-1), except that suspended slurry with the pH adjusted to 10.0 was warmed to 60° C. and held for one hour. Table 3 shows the properties of silica-alumina No. 2SE.

Preparation of Fluid Catalytic Cracking Catalyst No. 2CE

Fluid catalytic cracking catalyst No. 2CE was obtained in the same manner as (2-1), except that silica-alumina No. 2SE was used as the silica-alumina slurry. Table 4 shows the catalyst composition and the catalyst properties of fluid catalytic cracking catalyst No. 2CE.

[Catalytic Activity Evaluation Test]

For the catalysts of (2-1) to (2-E), a catalyst performance evaluation test was performed using the same crude oil and the same reaction conditions by an advanced cracking evaluation micro activity test (ACE-MAT). Before the performance evaluation test of these catalysts was performed, a pseudo-equilibration treatment was performed by precipitating nickel and vanadium on the surface of each catalyst in advance at a ratio of 1000 mass ppm (the mass of the nickel was divided by the mass of the catalyst) and at a ratio of 2000 mass ppm (the mass of the vanadium was divided by the mass of the catalyst), respectively, and then steaming.

The operation conditions in the activity evaluation test were as follows.

Raw material oil: desulfurized atmospheric distillation residue (DSAR) of crude oil Mass ratio of catalyst/throughput (C/O): 5.0

Reaction temperature: 520° C.

1) Conversion ratio=100−(LCO+HCO)
2) Gasoline boiling range: 30 to 216° C.
3) LCO boiling range: 216 to 343° C. (LCO: Light Cycle Oil)
4) HCO boiling range: 343° C.+(HCO: Heavy Cycle Oil)

The result of the activity evaluation test is as shown in Table 5. Catalysts 2C1 to 2C5 can be evaluated as being catalytic cracking catalysts excellent in conversion ratio as well as in coke yield and HCO yield compared with catalysts 2CA to 2CE.

TABLE 3

| | Silica-alumina species | 2S1 | 2S2 | 2S3 | 2S4 | 2S5 | 2SA | 2SB | 2SC | 2SD | 2SE |
|---|---|---|---|---|---|---|---|---|---|---|---|
| Preparation conditions | Amount of $SiO_2$ added (mass %) | 20 | 15 | 25 | 20 | 20 | 3 | 40 | 20 | 20 | 20 |
| | pH(45° C.) | 10.0 | 10.0 | 10.0 | 9.5 | 10.5 | 10.0 | 11.5 | 11.5 | 8.5 | 10.0 |
| | Aging temperature (° C.) | 95 | 95 | 95 | 95 | 95 | 95 | 95 | 95 | 95 | 60 |
| Properties | Specific surface area ($m^2/g$) | 438 | 420 | 478 | 438 | 430 | 359 | 205 | 406 | 392 | 450 |
| | Pore volume (ml/g) | 1.04 | 0.98 | 1.06 | 0.99 | 1.02 | 0.89 | 1.10 | 0.90 | 0.96 | 0.92 |
| | Acid amount (μmol/g) @ 100 to 500° C. | 617 | 593 | 567 | 630 | 539 | 480 | 301 | 465 | 536 | 593 |
| | Acid amount (μmol/g) @ 400 to 500° C. | 87 | 61 | 67 | 84 | 72 | 20 | 10 | 36 | 48 | 54 |
| | Strong acid ratio (%) | 14.1 | 10.3 | 11.8 | 13.3 | 13.4 | 4.2 | 3.3 | 7.7 | 9.0 | 9.1 |
| | Amount of Broensted acid (μmol/g) | 4.4 | 3.2 | 3.5 | 4.4 | 3.8 | 0.0 | 2.2 | 2.5 | 3.0 | 3.8 |
| | Amount of Lewis acid (μmol/g) | 303 | 296 | 287 | 307 | 277 | 258 | 200 | 253 | 280 | 295 |

TABLE 4

| | Catalyst species | 2C1 | 2C2 | 2C3 | 2C4 | 2C5 | 2CA | 2CB | 2CC | 2CD | 2CE |
|---|---|---|---|---|---|---|---|---|---|---|---|
| | Silica-alumina species | 2S1 | 2S2 | 2S3 | 2S4 | 2S5 | 2SA | 2SB | 2SC | 2SD | 2SE |
| Catalyst composition (mass %) | Binder | 20 | 20 | 20 | 20 | 20 | 20 | 20 | 20 | 20 | 20 |
| | Zeolite | 25 | 25 | 25 | 25 | 25 | 25 | 25 | 25 | 25 | 25 |
| | Activated alumina | 15 | 15 | 15 | 15 | 15 | 15 | 15 | 15 | 15 | 15 |
| | Kaolin | 25 | 25 | 25 | 25 | 25 | 25 | 25 | 25 | 25 | 25 |
| | Silica-alumina | 15 | 15 | 15 | 15 | 15 | 15 | 15 | 15 | 15 | 15 |
| Catalyst properties | ABD (g/ml) | 0.72 | 0.73 | 0.70 | 0.72 | 0.72 | 0.74 | 0.62 | 0.72 | 0.72 | 0.72 |
| | Total specific surface area ($m^2/g$) | 274 | 270 | 268 | 276 | 272 | 276 | 244 | 265 | 265 | 275 |
| | Matrix specific surface area ($m^2/g$) | 130 | 129 | 135 | 132 | 128 | 112 | 115 | 120 | 120 | 132 |
| | Total pore volume (ml/g) | 0.21 | 0.20 | 0.25 | 0.21 | 0.21 | 0.20 | 0.37 | 0.22 | 0.20 | 0.19 |
| | Pore volume (ml/g. 4-100 nm) | 0.11 | 0.10 | 0.12 | 0.11 | 0.11 | 0.09 | 0.13 | 0.11 | 0.11 | 0.10 |
| | Pore volume (ml/g. 100-1000 nm) | 0.10 | 0.11 | 0.13 | 0.10 | 0.10 | 0.11 | 0.23 | 0.11 | 0.09 | 0.09 |
| | Abrasion resistance (attrition) | 4.3 | 3.5 | 4.7 | 4.2 | 4.4 | 3.1 | 6.8 | 3.4 | 4.2 | 4.1 |

TABLE 5

| Catalyst species | 2C1 | 2C2 | 2C3 | 2C4 | 2C5 | 2CA | 2CB | 2CC | 2CD | 2CE |
|---|---|---|---|---|---|---|---|---|---|---|
| Conversion ratio (C/O = 5.0) (mass %) | 77.6 | 77.1 | 77.3 | 77.3 | 77.6 | 76.5 | 75.5 | 76.7 | 76.7 | 76.4 |
| Hydrogen (mass %) | 0.5 | 0.6 | 0.5 | 0.6 | 0.5 | 0.6 | 0.5 | 0.6 | 0.6 | 0.5 |
| C1 + C2 (mass %) | 2.1 | 2.2 | 2.1 | 2.2 | 2.2 | 2.1 | 1.9 | 2.1 | 2.2 | 2.1 |
| LPG (mass %) | 16.5 | 16.1 | 16.3 | 16.3 | 16.4 | 15.6 | 15.5 | 15.7 | 15.8 | 15.8 |
| Gasoline (mass %) | 50.1 | 49.5 | 50.3 | 49.8 | 50.0 | 49.2 | 50.5 | 49.1 | 49.6 | 49.5 |
| LCO (mass %) | 16.0 | 16.3 | 16.1 | 16.1 | 15.9 | 16.3 | 16.9 | 16.5 | 16.4 | 16.5 |
| HCO (mass %) | 6.4 | 6.7 | 6.6 | 6.6 | 6.5 | 7.2 | 7.6 | 6.9 | 6.9 | 7.1 |
| Coke (mass %) | 8.3 | 8.7 | 8.0 | 8.4 | 8.4 | 8.9 | 7.1 | 9.2 | 8.5 | 8.6 |

Example 3

(3-1)

Diluted water glass with an $SiO_2$ concentration of 5 mass % was ion-exchanged with a cation-exchange resin to prepare a desalted silicic acid solution having a pH of 2.67. 1750 g of pure water was added to 1440 g of the desalted silicic acid solution with an $SiO_2$ concentration of 5 mass %, and a 15 mass % ammonia aqueous solution was added to this mixture to adjust the pH to 10.8. 810 g of CATAPAL200 (crystallite diameter in (020) plane: 22.5 nm, specific surface area 94 $m^2/g$) manufactured by SASOL shown in AA of Table 6 ($Al_2O_3$ concentration 80 mass %) was added to the aforementioned diluted silicic acid solution with the pH adjusted to 10.8, and the mixture was stirred at room temperature for 30 minutes. Further, a 15 mass % ammonia aqueous solution was added to adjust the pH of the slurry to 10.8. Then, this slurry was charged into an autoclave, and while it was being stirred, the temperate was raised to 180° C. over three hours. After eight hours of heat treatment, silica-alumina slurry (1) was obtained.

Silica-alumina slurry (1) was dried at 130° C. for ten hours and pulverized by a mixer. The resulting powder was washed with warm water and then ion-exchanged and washed with warm water using an ammonium sulfate aqueous solution to obtain a washed cake. The washed cake was dried at 130° C. for ten hours to obtain silica-alumina powder 3S1. The physical properties etc. of silica-alumina powder 3S1 are shown in Table 7-1, and CO adsorption FT-IR measurement spectra thereof are shown in FIG. 1.

[Preparation of Fluid Catalytic Cracking Catalyst]

1429 g of water glass ($SiO_2$ concentration 17.5 mass %) and 571 g of sulfuric acid (adjusted to a concentration of 25 mass %; the same applies hereinafter) were simultaneously and continuously added to prepare 2000 g of silica sol (one example of silica-based binders) having an $SiO_2$ concentration of 12.5 mass %. 1625 g (dry basis) of kaolin clay, 250 g (dry basis) of silica-alumina powder 3S1, and 375 g (dry basis) of ultra-stabilized Y-type zeolite powder ($SiO_2/Al_2O_3$ molar ratio 7.1, unit crystallite size 2.440 nm; the same applies hereinafter) were added to the silica sol to prepare mixed slurry. This mixed slurry was turned into liquid droplets and spray-dried by a spray-drying machine at an inlet temperature of 250° C. and an outlet temperature of 150° C. to obtain spherical particles with an average particle diameter of 70 μm. The obtained spray-dried particles were washed with warm water, and were then ion-exchanged and washed with warm water using an ammonium sulfate aqueous solution and a rare-earth metal chloride aqueous solution to perform an ion-exchange treatment so as to achieve 1.0 mass % $RE_2O_3$. Thereafter, the catalyst particles were dried by a drying machine at an atmospheric temperature of 150° C. to obtain fluid catalytic cracking catalyst 3C1.

(3-2)

6280 g of an aluminum sulfate aqueous solution ($Al_2O_3$ concentration 2.5 mass %) was added to 6530 g of a sodium aluminate aqueous solution ($Al_2O_3$ concentration 5 mass %), and the mixture was stirred at 65° C. for one hour to obtain alumina slurry. Then, this alumina slurry was washed with warm water. The dry weights of $Na_2O$ and $SO_4$ in the washed alumina cake were 2% or less and 1% or less, respectively. Next, pure water was added to the washed alumina cake to prepare washed alumina slurry with an $Al_2O_3$ concentration of 12.5%, and an aqueous solution of 48 mass % sodium hydroxide was added thereto to adjust the pH to 11.5. Then, this slurry was aged while being stirred at 95° C. for 20 hours to obtain crystalline boehmite slurry (hereinafter, slurry A, AB of Table 6) (crystallite diameter in (020) plane: 10.7 nm, specific surface area: 178 $m^2/g$).

Diluted water glass with an $SiO_2$ concentration of 5 mass % was ion-exchanged with a cation-exchange resin to prepare a desalted silicic acid solution having a pH of 2.67. A 15 mass % ammonia aqueous solution was added to 620 g of the 5 mass % desalted silicic acid solution to adjust the pH to 10.8. This desalted silicic acid solution with the pH adjusted to 10.8 was added to 3100 g of slurry A ($Al_2O_3$ concentration 9 mass %), and the slurry was stirred at room temperature for 30 minutes. Then, this slurry was aged while being stirred at 95° C. for eight hours to obtain silica-alumina slurry (2).

From silica-alumina slurry (2), silica-alumina powder 3S2 was obtained by performing the same operation as (3-1). The physical properties etc. of silica-alumina powder 3S2 are shown in Table 7-1, and CO adsorption FT-IR measurement spectra thereof are shown in FIG. 1.

[Preparation of Fluid Catalytic Cracking Catalyst]

Fluid catalytic cracking catalyst 3C2 was obtained by performing the same operation as (3-1), except that silica-alumina powder 3S1 was changed to silica-alumina powder 3S2.

(3-3)

Silica-alumina slurry (3) was obtained by performing the same operation as Example 2, except that the amount of the desalted silicic acid solution with an $SiO_2$ concentration of 5 mass % was changed to 985 g.

From silica-alumina slurry (3), silica-alumina powder 3S3 was obtained by performing the same operation as (3-1). The physical properties etc. of silica-alumina powder 3S3 are shown in Table 7-1, and CO adsorption FT-IR measurement spectra thereof are shown in FIG. 1.

[Preparation of Fluid Catalytic Cracking Catalyst]

Fluid catalytic cracking catalyst 3C3 was obtained by performing the same operation as (3-1), except that silica-alumina powder 3S1 was changed to silica-alumina powder 3S3.

(3-4)

Silica-alumina slurry (4) was obtained by performing the same operation as Example 2, except that the step of aging the mixed slurry of slurry A and the desalted silicic acid solution with the pH adjusted to 10.8 was changed from "at 95° C. for eight hours" to "at 150° C. for eight hours inside an autoclave."

From silica-alumina slurry (4), silica-alumina powder 3S4 was obtained by performing the same operation as (3-1). The physical properties etc. of silica-alumina powder 3S4 are shown in Table 7-1, and CO adsorption FT-IR measurement spectra thereof are shown in FIG. 1.

[Preparation of Fluid Catalytic Cracking Catalyst]

Fluid catalytic cracking catalyst 3C4 was obtained by performing the same operation as (3-1), except that silica-alumina powder 3S1 was changed to silica-alumina powder 3S4.

(3-5)

Preparation was performed in accordance with the method described in EXAMPLE 4 of Patent Literature 6, by using CATAPAL-A manufactured by SASOL as the raw material of alumina slurry, reducing the amount of alumina slurry added during heat treatment to 70%, and performing heat treatment for one hour after adding the alumina slurry. Thus, crystalline boehmite slurry (hereinafter, slurry B, AC of Table 6) (crystallite diameter in (020) plane: 39.0 nm, specific surface area 85 $m^2/g$) was obtained.

Diluted water glass with an $SiO_2$ concentration of 5 mass % was ion-exchanged with a cation-exchange resin to prepare a desalted silicic acid solution having a pH of 2.67. A 15 mass % ammonia aqueous solution was added to 620 g of the 5 mass % desalted silicic acid solution to adjust the pH to 10.8. This desalted silicic acid solution with the pH adjusted to 10.8 was added to 2536 g of slurry B ($Al_2O_3$ concentration 11 mass %), and the slurry was stirred at room temperature for 30 minutes. Then, this slurry was charged into an autoclave, and while it was being stirred, the temperature was raised to 180° C. over three hours. After eight hours of heat treatment, silica-alumina slurry (5) was obtained.

From silica-alumina slurry (5), silica-alumina powder 3S5 was obtained by performing the same operation as (3-1). The physical properties etc. of silica-alumina powder 3S5 are shown in Table 7-1, and CO adsorption FT-IR measurement spectra thereof are shown in FIG. 1.

[Preparation of Fluid Catalytic Cracking Catalyst]

Fluid catalytic cracking catalyst 3C5 was obtained by performing the same operation as (3-1), except that silica-alumina powder 3S1 was changed to silica-alumina powder 3S5.

(3-A)

The physical properties etc. of alumina CATAPAL200 manufactured by SASOL as 3SA are shown in Table 7-2, and CO adsorption FT-IR measurement spectra thereof are shown in FIG. 2.

[Preparation of Fluid Catalytic Cracking Catalyst]

Fluid catalytic cracking catalyst 3CA was obtained by performing the same operation as (3-1), except that silica-alumina slurry 3S1 was changed to alumina CATAPAL200 manufactured by SASOL (3SA).

(3-B)

Slurry A was dried at 130° C. for ten hours and pulverized by a mixer. The resulting powder was washed with warm water and then ion-exchanged and washed with warm water using an ammonium sulfate aqueous solution to obtain a washed alumina cake. The washed alumina cake was dried at 130° C. for ten hours to obtain crystalline boehmite powder A. The physical properties etc. of alumina powder A as 3SB are shown in Table 7-2, and CO adsorption FT-IR measurement spectra thereof are shown in FIG. 2.

[Preparation of Fluid Catalytic Cracking Catalyst]

Fluid catalytic cracking catalyst 3CB was obtained by performing the same operation as (3-1), except that silica-alumina powder 3S1 was changed to alumina powder A (3SB).

(3-C)

Silica-alumina slurry (6) was obtained by performing the same operation as (3-2), except that the amount of the desalted silicic acid solution with an $SiO_2$ concentration of 5 mass % was changed to 356 g.

From silica-alumina slurry (6), silica-alumina powder 3SC was obtained by performing the same operation as (3-1). The physical properties etc. of silica-alumina powder 3SC are shown in Table 7-2, and CO adsorption FT-IR measurement spectra thereof are shown in FIG. 2.

[Preparation of Fluid Catalytic Cracking Catalyst]

Fluid catalytic cracking catalyst 3CC was obtained by performing the same operation as (3-1), except that silica-alumina powder S1 was changed to silica-alumina powder SC.

(3-D)

Diluted water glass with an $SiO_2$ concentration of 5 mass % was ion-exchanged with a cation-exchange resin to prepare a desalted silicic acid solution having a pH of 2.67. 1696 g of pure water was added to 1440 g of the desalted silicic acid solution with an $SiO_2$ concentration of 5 mass %, and a 15 mass % ammonia aqueous solution was added to this mixture to adjust the pH to 10.8. 864 g of CATAPAL-A (crystallite diameter in (020) plane: 2.9 nm, specific surface area 266 $m^2/g$) manufactured by SASOL shown as AD of Table 6 ($Al_2O_3$ concentration 75 wt %) was added to the diluted silicic acid solution with the pH adjusted to 10.8, and the mixture was stirred at room temperature for 30 minutes. Further, a 15 mass % ammonia aqueous solution was added to adjust the pH of the slurry to 10.8. Then, this slurry was charged into an autoclave, and while it was being stirred, the temperate was raised to 150° C. over two and a half hours. After eight hours of heat treatment, silica-alumina slurry (7) was obtained.

From silica-alumina slurry (7), silica-alumina powder 3SD was obtained by performing the same operation as (3-1). The physical properties etc. of silica-alumina powder 3SD are shown in Table 7-2, and CO adsorption FT-IR measurement spectra thereof are shown in FIG. 2.

[Preparation of Fluid Catalytic Cracking Catalyst]

Fluid catalytic cracking catalyst 3CD was obtained by performing the same operation as (3-1), except that silica-alumina powder 3S1 was changed to silica-alumina powder 3SD.

(3-E)

The physical properties etc. of silica-alumina SIRAL20 manufactured by SASOL as 3SE are shown in Table 7-2, and CO adsorption FT-IR measurement spectra thereof are shown in FIG. 2.

[Preparation of Fluid Catalytic Cracking Catalyst]

Fluid catalytic cracking catalyst CE was obtained by performing the same operation as (3-1), except that silica-alumina powder 3S1 was changed to silica-alumina SIRAL20 manufactured by SASOL (3SE).

(3-F)

Preparation was performed in accordance with the method described in EXAMPLE 4 of Patent Literature 7 by using CATAPAL-A manufactured by SASOL as the raw material of alumina slurry, and performing heat treatment for one hour after adding the alumina slurry. Thus, crystalline boehmite slurry (hereinafter, slurry C, AE of Table 6) (crystallite diameter in (020) plane: 67.3 nm, specific surface area 52 $m^2/g$) was obtained.

Diluted water glass with an $SiO_2$ concentration of 5 mass % was ion-exchanged with a cation-exchange resin to prepare a desalted silicic acid solution having a pH of 2.67. A 15 mass % ammonia aqueous solution was added to 620 g of the 5 mass % desalted silicic acid solution to adjust the pH to 10.8. This desalted silicic acid solution with the pH adjusted to 10.8 was added to 2536 g of slurry C ($Al_2O_3$ concentration 11 mass %), and the slurry was stirred at room temperature for 30 minutes. Then, this slurry was charged into an autoclave, and while it was being stirred, the temperature was raised to 180° C. over three hours. After eight hours of heat treatment, silica-alumina slurry (8) was obtained.

From silica-alumina slurry (8), silica-alumina powder 3SF was obtained by performing the same operation as (3-1). The physical properties etc. of silica-alumina powder 3SF are shown in Table 7-2, and CO adsorption FT-IR measurement spectra thereof are shown in FIG. 2.

[Preparation of Fluid Catalytic Cracking Catalyst]

Fluid catalytic cracking catalyst 3CF was obtained by performing the same operation as (3-1), except that silica-alumina powder 3S1 was changed to silica-alumina powder 3SF.

[Catalytic Activity Evaluation Test]

For catalysts 3C1 to 3CF, a catalyst performance evaluation test was performed with the same crude oil and the same reaction conditions using an advanced cracking evaluation micro activity test (ACE-MAT). Before the performance evaluation test of these catalysts was performed, a pseudo-equilibration treatment was performed by precipitating nickel and vanadium on the surface of each catalyst in advance at a ratio of 1000 mass ppm (the mass of the nickel was divided by the mass of the catalyst) and at a ratio of 2000 mass ppm (the mass of the vanadium was divided by the mass of the catalyst), respectively, and then steaming.

The operation conditions in the activity evaluation test were as follows.

Raw material oil: desulfurized atmospheric distillation residue (DSAR) of crude oil+desulfurized vacuum gas oil (DSVGO) (50+50)

Mass ratio of catalyst/throughput (C/O): 3.75 and 5.00

Reaction temperature: 520° C.

1) Conversion ratio=100−(LCO+HCO)

2) Gasoline boiling range: 30 to 216° C.

3)_LCO boiling range: 216 to 343° C. (LCO: Light Cycle Oil)

4) HCO boiling range: 343° C.+(HCO: Heavy Cycle Oil)

The result of the activity evaluation test is as shown in Table 8. Catalysts 3C1 to 3C5 can be evaluated as being fluid catalytic cracking catalysts that have lower coke yields and higher gasoline yields compared with catalysts 3CA to 3CF.

TABLE 6

| Alumina species | | AA | AB | AC | AD | AE |
|---|---|---|---|---|---|---|
| Name | | CATAPAL200 | Slurry A | Slurry B | CATAPAL-A | Slurry C |
| Crystalline form | | Boehmite | Boehmite | Boehmite | Boehmite | Boehmite |
| Crystallite diameter in (020) plane | nm | 22.5 | 10.7 | 39.0 | 2.9 | 67.3 |

TABLE 7-1

| Silica-alumina species (alumina species) | | | 3S1 | 3S2 | 3S3 | 3S4 | 3S5 |
|---|---|---|---|---|---|---|---|
| | Alumina source | | AA | AB | AB | AB | AC |
| | Silica source | | Desalted silicic acid | Desalted silicic acid | Desalted silicic acid | Desalted silicic acid | Desalted silicic acid |
| Charged composition | $SiO_2/Al_2O_3$ | mass ratio | 10/90 | 10/90 | 15/85 | 10/90 | 10/90 |
| Aging conditions | Temperature | ° C. | 180 | 95 | 95 | 150 | 180 |
| | Time | hr | 8 | 8 | 8 | 8 | 8 |
| Silica-alumina powder properties | LOI (1000° C. −1 hr) | % | 16.6 | 18.8 | 18.4 | 18.5 | 15.4 |
| | $SiO^2$ | mass % | 9.7 | 8.5 | 13.2 | 9.0 | 9.8 |
| | $Al_2O_3$ | mass % | 90.3 | 91.3 | 86.7 | 90.8 | 90.2 |
| | $Na_2O$ | mass % | 0.0 | 0.1 | 0.1 | 0.2 | 0 |
| | $SO_4$ | mass % | 0.0 | 0.1 | 0.1 | 0.0 | 0 |
| | Specific surface area ($m^2/g$) | $m^2/g$ | 120 | 199 | 200 | 196 | 112 |
| | Temperature of crystal transformation (° C.) | ° C. | 506 | 478 | 479 | 477 | 510 |
| | Crystallite diameter in (020) plane | nm | 25.6 | 12.4 | 12.8 | 11.6 | 38.6 |
| | Amount of Broensted acid | μ mol/g | 1 | 2 | 6 | 2 | 2 |
| | Amount of Lewis acid | μ mol/g | 105 | 158 | 163 | 156 | 86 |
| | Total acid amount | μ mol/g | 106 | 160 | 169 | 158 | 88 |
| | Acid density | μ mol/$m^2$ | 0.88 | 0.80 | 0.85 | 0.81 | 0.79 |
| | FT-IR (CO adsorption measurement) 2230 $cm^{-1}$ | | Present | Present | Present | Present | Present |

TABLE 7-2

| Silica-alumina species (alumina species) | | | 3SA | 3SB | 3SC | 3SD | 3SE | 3SF |
|---|---|---|---|---|---|---|---|---|
| | Alumina source | | AA | AB | AB | AD | SIRAL20 | AE |
| | Silica source | | — | — | Desalted silicic acid | Desalted silicic acid | SIRAL20 | Desalted silicic acid |
| Charged composition | $SiO_2/Al_2O_3$ | mass ratio | 0/100 | 0/100 | 6/94 | 10/90 | — | 10/90 |
| Aging conditions | Temperature | ° C. | — | — | 95 | 150 | — | 180 |
| | Time | hr | — | — | 8 | 8 | — | 8 |
| Silica-alumina powder properties | LOI (1000° C. −1 hr) | % | 17 | 21.9 | 18.4 | 24 | 21.4 | 14.3 |
| | $SiO_2$ | mass % | 0 | 0 | 4.9 | 9.7 | 29.6 | 9.6 |
| | $Al_2O_3$ | mass % | 100 | 99.9 | 94.9 | 90.3 | 70.4 | 90.4 |
| | $Na_2O$ | mass % | 0 | 0.1 | 0.1 | 0 | 0 | 0 |
| | $SO_4$ | mass % | 0 | 0 | 0.1 | 0 | 0 | 0 |
| | Specific surface area ($m^2/g$) | $m^2/g$ | 94 | 178 | 212 | 287 | 429 | 76 |
| | Temperature of crystal transformation (° C.) | ° C. | 497 | 454 | 468 | 464 | 450 | 518 |
| | Crystallite diameter in (020) plane | nm | 22.5 | 10.7 | 12.4 | 2.9 | 2.7 | 65.7 |
| | Amount of Broensted acid | μ mol/g | 0 | 0 | 0 | 1 | 6 | 2 |
| | Amount of Lewis acid | μ mol/g | 104 | 151 | 157 | 296 | 280 | 53 |
| | Total acid amount | μ mol/g | 104 | 151 | 157 | 297 | 286 | 55 |
| | Acid density | μ mol/$m^2$ | 1.11 | 0.84 | 0.74 | 1.03 | 0.67 | 0.72 |
| | FT-IR (CO adsorption measurement) 2230 $cm^{-1}$ | | Absent | Absent | Absent | Absent | Present | Present |

SIRAL20 is the name of a silica-alumina product of Sasol.

TABLE 8

| Catalyst species | 3C1 | 3C2 | 3C3 | 3C4 | 3C5 | 3CA | 3CB | 3CC | 3CD | 3CE | 3CF |
|---|---|---|---|---|---|---|---|---|---|---|---|
| Silica-alumina species | 3S1 | 3S2 | 3S3 | 3S4 | 3S5 | 3SA | 3SB | 3SC | 3SD | 3SE | 3SF |
| Conversion ratio (C/O = 5.0) (mass %) | 68.1 | 68.3 | 68.6 | 68.4 | 67.7 | 65.8 | 68 | 67.2 | 69.9 | 70.2 | 62.4 |

TABLE 8-continued

| Catalyst species | | 3C1 | 3C2 | 3C3 | 3C4 | 3C5 | 3CA | 3CB | 3CC | 3CD | 3CE | 3CF |
|---|---|---|---|---|---|---|---|---|---|---|---|---|
| Selectivity (in terms of conversion ratio of 65 mass %) | Hydrogen (mass %) | 0.4 | 0.4 | 0.4 | 0.4 | 0.3 | 0.3 | 0.5 | 0.5 | 0.6 | 0.7 | 0.3 |
| | C1 + C2 (mass %) | 1.3 | 1.4 | 1.5 | 1.4 | 1.3 | 1.4 | 1.5 | 1.5 | 1.6 | 1.6 | 1.4 |
| | LPG (mass %) | 11.0 | 10.8 | 10.7 | 10.7 | 11.1 | 11.1 | 10.6 | 10.8 | 10.6 | 10.3 | 11.5 |
| | Gasoline (mass %) | 47.9 | 47.8 | 47.9 | 47.9 | 48.1 | 47.4 | 47.4 | 47.3 | 46.5 | 46.0 | 47.1 |
| | LCO (mass %) | 19.8 | 20.3 | 20.1 | 20.3 | 19.5 | 19.2 | 20.5 | 20.1 | 20.8 | 20.6 | 17.8 |
| | HCO (mass %) | 15.2 | 14.7 | 14.9 | 14.7 | 15.5 | 15.8 | 14.5 | 14.9 | 14.2 | 14.4 | 17.2 |
| | Coke (mass %) | 4.4 | 4.6 | 4.5 | 4.6 | 4.2 | 4.8 | 5.1 | 4.9 | 5.7 | 6.4 | 4.7 |

The invention claimed is:

1. A silica-alumina powder, characterized in that the silica- alumina powder contains greater than 98 mass % of silica and alumina and has the following characteristics:

that $SiO_2$ is contained within a range of 2 to 70 mass %;

that a mass ratio of silica to alumina is within a range of 2/98 to 70/30;

that a specific surface area measured by a BET method is within a range of 400 to 600 $m^2/g$;

that a pore volume measured by a BJH method is within a range of 1.0 to 2.0 ml/g;

that one selected from boehmite, pseudo-boehmite, and mainly amorphous alumina gel, or a mixture of some of these materials is contained; and that a CCIC attrition index, or CAI, is lower than 10.

2. The silica-alumina powder according to claim 1, wherein the silica-alumina powder is porous silica-alumina particles and has the following characteristics:

that a pore volume measured by a BJH method is within a range of 1.10 to 1.90 ml/g; and that an average pore diameter measured by the BJH method is within a range of 6 to 30 nm.

3. A method for producing silica-alumina powder containing greater than 98 mass % of silica and alumina, characterized in that the method comprises:

(A) a step of mixing an aqueous solution including pseudo-boehmite alumina hydrate and an aqueous solution containing a silica powder to prepare an aqueous solution A including a silica-alumina precursor;

(B) a step of adjusting a pH of the aqueous solution A including the silica-alumina precursor obtained in step (A) to be within a range of 7.0 to 9.0, and then heat-treating the aqueous solution A at a temperature within a range of 40 to 95°C for a time within a range of ten minutes to 10 hours; and (C) a step of cooling the aqueous solution heat-treated in step (B) or silica-alumina slurry obtained by the heat treatment, then separating and washing a solid, and then drying or further calcining the solid to obtain the silica-alumina powder.

* * * * *